US010953544B2

United States Patent
Diankov et al.

(10) Patent No.: US 10,953,544 B2
(45) Date of Patent: Mar. 23, 2021

(54) ROBOTIC SYSTEM WITH COORDINATION MECHANISM AND METHODS OF OPERATING THE SAME

(71) Applicant: Mujin, Inc., Tokyo (JP)

(72) Inventors: Rosen Nikolaev Diankov, Tokyo (JP); Isamu Arase, Tokyo (JP); Satoshi Tendo, Tokyo (JP); Huan Liu, Tokyo (JP); Shekhar Gupta, Tokyo (JP); Ziyan Zhou, Tokyo (JP); Xuming Zheng, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 16/740,251

(22) Filed: Jan. 10, 2020

(65) Prior Publication Data
US 2020/0223066 A1 Jul. 16, 2020

Related U.S. Application Data

(60) Provisional application No. 62/792,348, filed on Jan. 14, 2019.

(51) Int. Cl.
*G05B 19/418* (2006.01)
*B25J 9/16* (2006.01)

(52) U.S. Cl.
CPC ............ *B25J 9/1664* (2013.01); *B25J 9/161* (2013.01); *B25J 9/1661* (2013.01); *B25J 9/1679* (2013.01)

(58) Field of Classification Search
CPC ........ B25J 9/1664; B25J 9/161; B25J 9/1661; B25J 9/1679
See application file for complete search history.

(56) References Cited

U.S. PATENT DOCUMENTS

| | | | |
|---|---|---|---|
| 9,428,336 B2 | 8/2016 | Hagen et al. | |
| 10,108,185 B1 | 10/2018 | Theobald | |
| 10,442,607 B2 | 10/2019 | Rudolf | |
| 2008/0167884 A1* | 7/2008 | Mountz | G06Q 10/0875 705/29 |
| 2010/0312388 A1 | 12/2010 | Jang et al. | |
| 2016/0129592 A1* | 5/2016 | Saboo | G05D 1/0297 700/248 |

(Continued)

FOREIGN PATENT DOCUMENTS

| | | |
|---|---|---|
| JP | H02091713 U | 7/1990 |
| JP | 2018507829 A | 3/2018 |

(Continued)

OTHER PUBLICATIONS

Korea International Search Authority, International Search Report and Written Opinion dated May 14, 2020 for PCT/US2020/013171 filed Jan. 10, 2020, 11 pages.

(Continued)

*Primary Examiner* — Harry Y Oh
(74) *Attorney, Agent, or Firm* — Perkins Coie LLP

(57) ABSTRACT

A system and method for operating a robotic system to coordinate and integrate multiple tasks for performing operations is disclosed. The robotic system may identify a set of tasks associated with a triggered operation. Accordingly, the robotic system may coordinate and control actions across subsystems, robotic units, task stations, or a combination thereof to sequentially perform the set of tasks and complete the operation.

20 Claims, 16 Drawing Sheets

(56) References Cited

U.S. PATENT DOCUMENTS

| | | | |
|---|---|---|---|
| 2016/0236867 A1* | 8/2016 | Brazeau | B65G 1/1378 |
| 2016/0325933 A1* | 11/2016 | Stiernagle | B65G 1/0457 |
| 2016/0325934 A1* | 11/2016 | Stiernagle | B25J 9/1679 |
| 2016/0327941 A1* | 11/2016 | Stiernagle | G05B 19/4155 |
| 2017/0021502 A1* | 1/2017 | Nusser | B25J 9/1697 |
| 2017/0100837 A1* | 4/2017 | Zevenbergen | B25J 5/00 |
| 2017/0136632 A1* | 5/2017 | Wagner | B25J 9/1697 |
| 2017/0158430 A1 | 6/2017 | Raizer | |
| 2017/0225330 A1* | 8/2017 | Wagner | B25J 9/1694 |
| 2017/0233188 A1* | 8/2017 | Tai | B65G 1/0492 414/281 |
| 2017/0278047 A1 | 9/2017 | Welty et al. | |
| 2018/0154399 A1* | 6/2018 | Wagner | B60P 3/007 |
| 2018/0215541 A1* | 8/2018 | Belardinelli | B65G 17/34 |
| 2018/0276604 A1* | 9/2018 | Gariepy | G05B 19/4184 |
| 2019/0361672 A1* | 11/2019 | Odhner | B25J 9/1697 |
| 2020/0094997 A1* | 3/2020 | Menon | B65B 57/14 |
| 2020/0095063 A1* | 3/2020 | Liu | G06Q 10/06 |
| 2020/0223634 A1 | 7/2020 | Arase et al. | |

FOREIGN PATENT DOCUMENTS

| | | |
|---|---|---|
| JP | 2018126273 A | 4/2020 |
| JP | 2018150124 A | 4/2020 |
| JP | 2018520957 A | 4/2020 |

OTHER PUBLICATIONS

Japan Patent Office Notice of Reasons for Rejection dated Jan. 12, 2021 for Japanese patent application No. 2020-521934, Applicant: MUJIN, Inc., 7 pages.

U.S. Patent Office Non-Final Office Action dated Nov. 12, 2020 for U.S. Appl. No. 16/739,971, First Inventor: Isamu Arase, 32 pages.

* cited by examiner

ROBOTIC SYSTEM WITH COORDINATION MECHANISM AND METHODS OF OPERATING THE SAME

CROSS-REFERENCE TO RELATED APPLICATION(S)

This application claims the benefit of U.S. Provisional Patent Application Ser. No. 62/792,348, filed Jan. 14, 2019, which is incorporated by reference herein in its entirety.

This application contains subject matter related to U.S. patent application Ser. No. 16/739,971, filed Jan. 10, 2020, titled "CONTROLLER AND CONTROL METHOD FOR ROBOT SYSTEM," which is incorporated herein by reference in its entirety.

TECHNICAL FIELD

The present technology is directed generally to robotic systems and, more specifically, to systems, processes, and techniques for coordinating operations of multiple units.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) for manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. For example, robot-to-robot interactions often require human intervention to fully coordinate and combine a sequence of tasks. Accordingly, there remains a need for improved techniques and systems for managing operations and/or interactions between robots.

DETAILED DESCRIPTION

Figure 1:
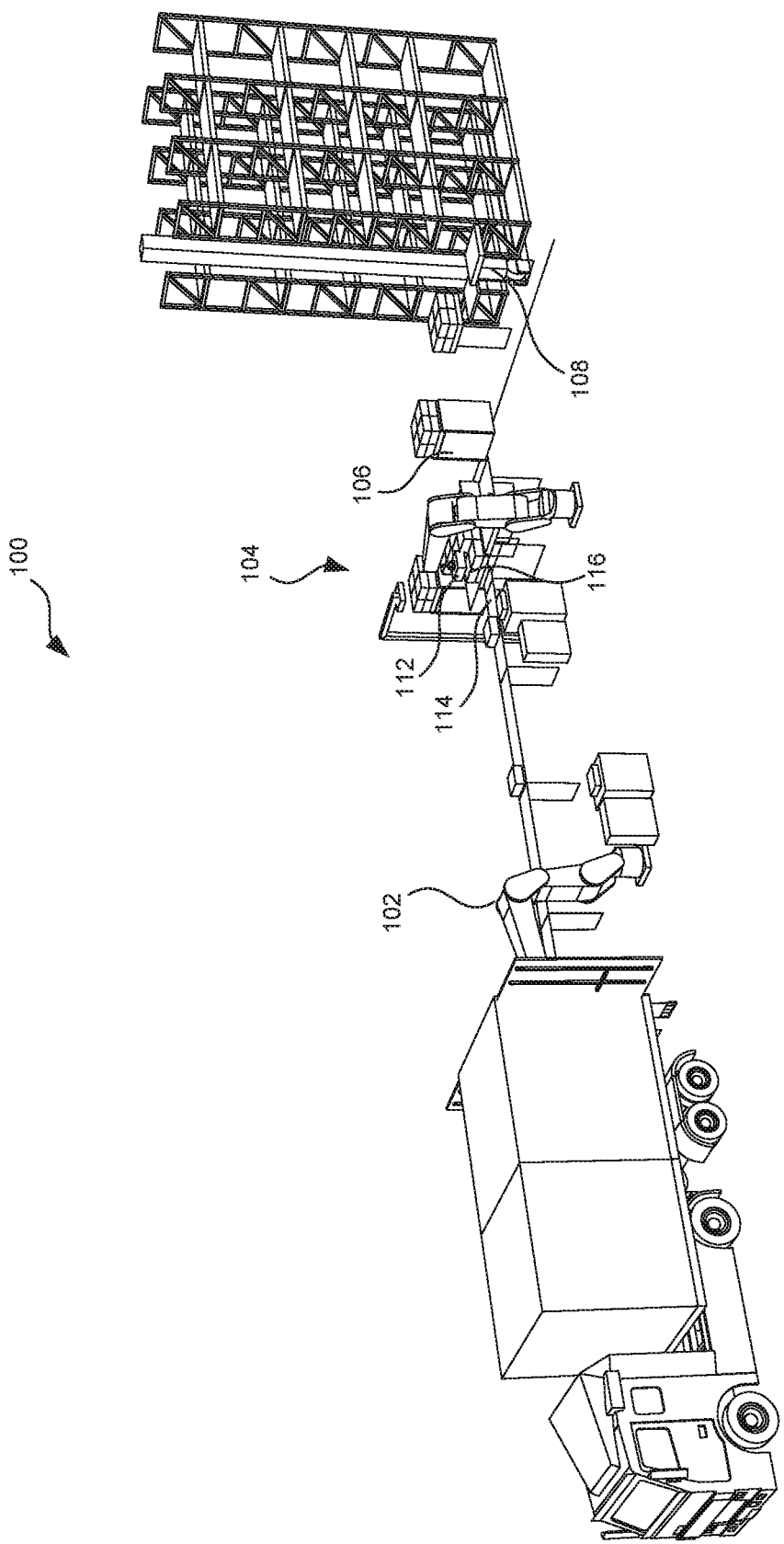
FIG. 1 is an illustration of an example environment in which a robotic system with a coordination mechanism may operate.

Systems and methods for robotic systems with automated object detection/registration mechanisms are described herein. A robotic system (e.g., an integrated system of devices that executes one or more designated tasks) configured in accordance with some embodiments autonomously executes sequences of integrated tasks (e.g., operations to achieve corresponding goals) by coordinating operations of multiple units (e.g., robots).

The integrated tasks or operations can include receiving operations, stocking operations, shipping operations, and/or other operations. The receiving operation can include a sequence of tasks for receiving incoming shipments of objects (e.g., packages and/or boxes including items). The stocking operation can include a sequence of tasks for placing the received objects and/or items in storage locations. The stocking operation can further include a sequence of tasks for reorganizing or regrouping objects and/or items for storage. The shipping operation can include a sequence of tasks for grouping items/objects for outbound shipments. As described in detail below, the sequenced tasks can include devanning tasks, sorting tasks, storage grouping tasks, group manipulation tasks, package opening tasks, racking tasks, picking tasks, packing tasks, and/or outbound grouping tasks. Also, as described below, the robotic system can coordinate interactions between multiple corresponding units, systems, and/or stations to perform the operations.

Traditional operations require inputs or assistance from human operators in executing typical integrated tasks. Traditional systems lack the sophisticated interaction between multiple robots and require operator assistance in connecting an end of a task of one robot with a beginning of a task for a different robot. For example, traditional systems may be able to access the bins corresponding to an order but require human operators to group/sequence the ordered items for the order. Also, for example, traditional systems may include picker robots that operate according to fixed inputs/outputs (e.g., conveyor inputs/outputs), but lack the sophistication to interact with other units to vary the inputs/outputs.

In comparison, the robotic system disclosed herein coordinates and controls the interactions between separate robotic units and/or stations to execute the operations, thereby reducing or eliminating human assistance for the execution. For example, the robotic system can identify operating zones, operating paths, transition locations, movement plans, corresponding timings, or a combination thereof for each of the units. Also, the robotic system can include one or more algorithms for sequencing the tasks of the different units and/or one or more protocols for controlling interactions between the units. The robotic system can further account for the interaction between multiple units and coordinate storage of items according to accessibility, projected load/order, estimated throughput, or a combination thereof. Details of the coordination and the controls are described below.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a coordination mechanism may operate. The robotic system 100 can include and/or communicate with one or more units (e.g., robots) configured to execute one or more tasks. Aspects of the coordination mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. For another example, the task can include placing the objects on a target location (e.g., on top of a pallet and/or inside a bin/cage/box/case). The robotic system can derive plans (e.g., placement locations/orientations, sequence for transferring the objects, and/or corresponding motion plans) for placing and/or stacking the objects. Each of the units can be configured to execute a sequence of actions (by, e.g., operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves).

The robotic system 100 can combine and/or sequence tasks to perform an operation that achieves a goal, such as to unload objects from a truck or a van and store them in a warehouse or to unload objects from storage locations and prepare them for shipping. Details regarding the operation and the associated actions are described below.

For illustrative purposes, the robotic system 100 is described in the context of a shipping center; however, it is understood that the robotic system 100 can be configured to execute tasks/operations in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 and/or the units thereof can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process the digital image and/or the point cloud to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, the robotic system 100 can determine the start location 114, the task location 116, the associated pose, the motion plan, and/or other processing result.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Suitable System

Figure 2:
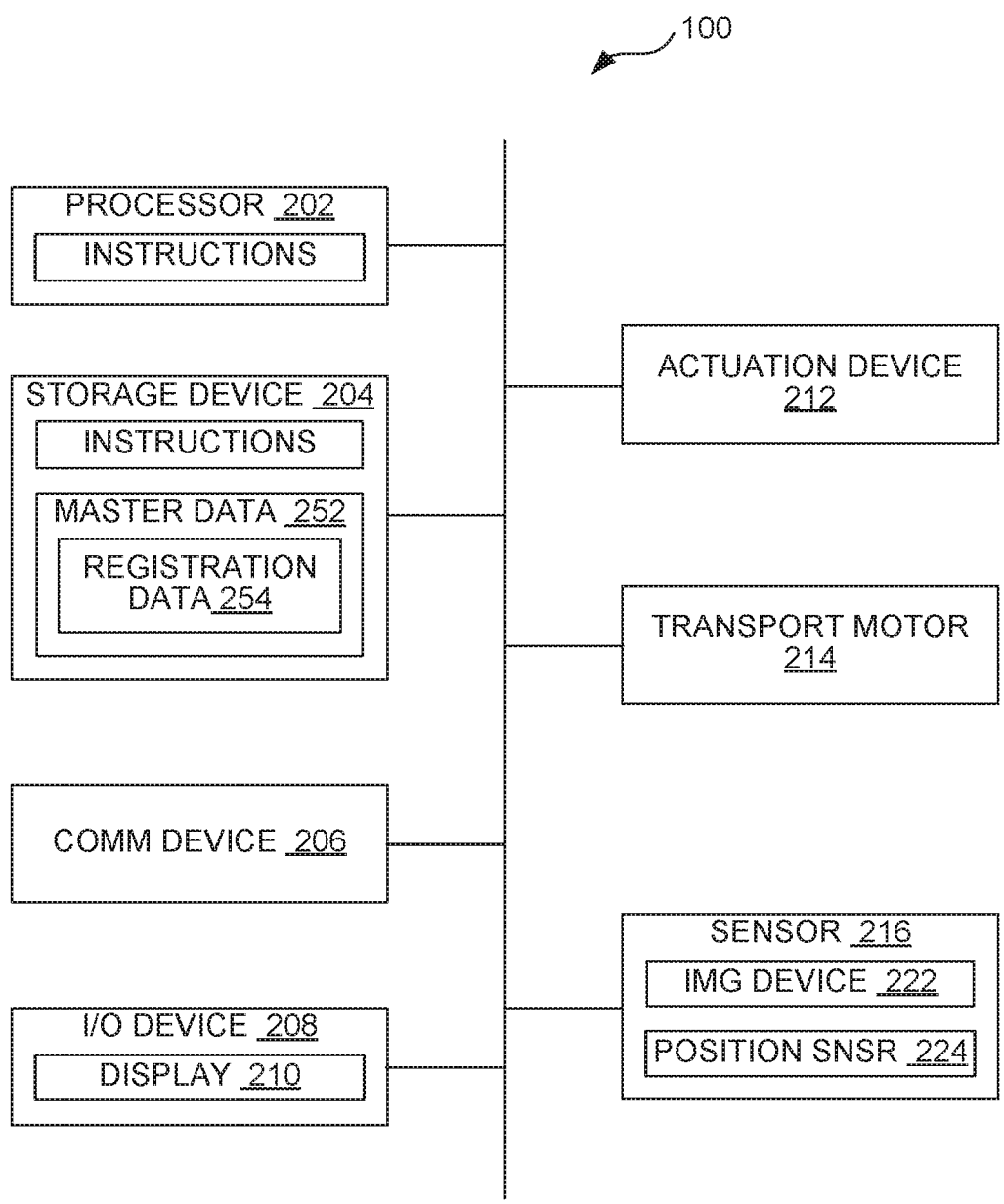
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include registration data 254 for each such object. The registration data 254 can include a dimension, a shape (e.g., templates for potential poses and/or computer-generated models for recognizing the object in different poses), a color scheme, an image, an identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location or an estimate thereof on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications).

In implementing/executing tasks and/or operations, the robotic system 100 (via, e.g., the various circuits/devices described above) can capture and analyze an image of a designated area (e.g., a pickup location, such as inside the truck or on the conveyor belt) to process the target object 112 of FIG. 1 and the start location 114 of FIG. 1 thereof. Similarly, the robotic system 100 can capture and analyze an image of another designated area (e.g., a drop location for placing objects on the conveyor, a location for placing objects inside the container, or a location on the pallet for stacking purposes) to process the task location 116 of FIG. 1. For example, the imaging devices 222 can include one or more cameras configured to generate images of the pickup area and/or one or more cameras configured to generate images of the task area (e.g., drop area). Based on the captured images, the robotic system 100 can determine the start location 114, the task location 116, the associated poses, a packing/placement plan, a transfer/packing sequence, and/or other processing results. Accordingly, the robotic system 100 can derive motion plans to perform tasks and/or interactions between units/tasks to perform operations.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Example Robotic Units

Figure 3:
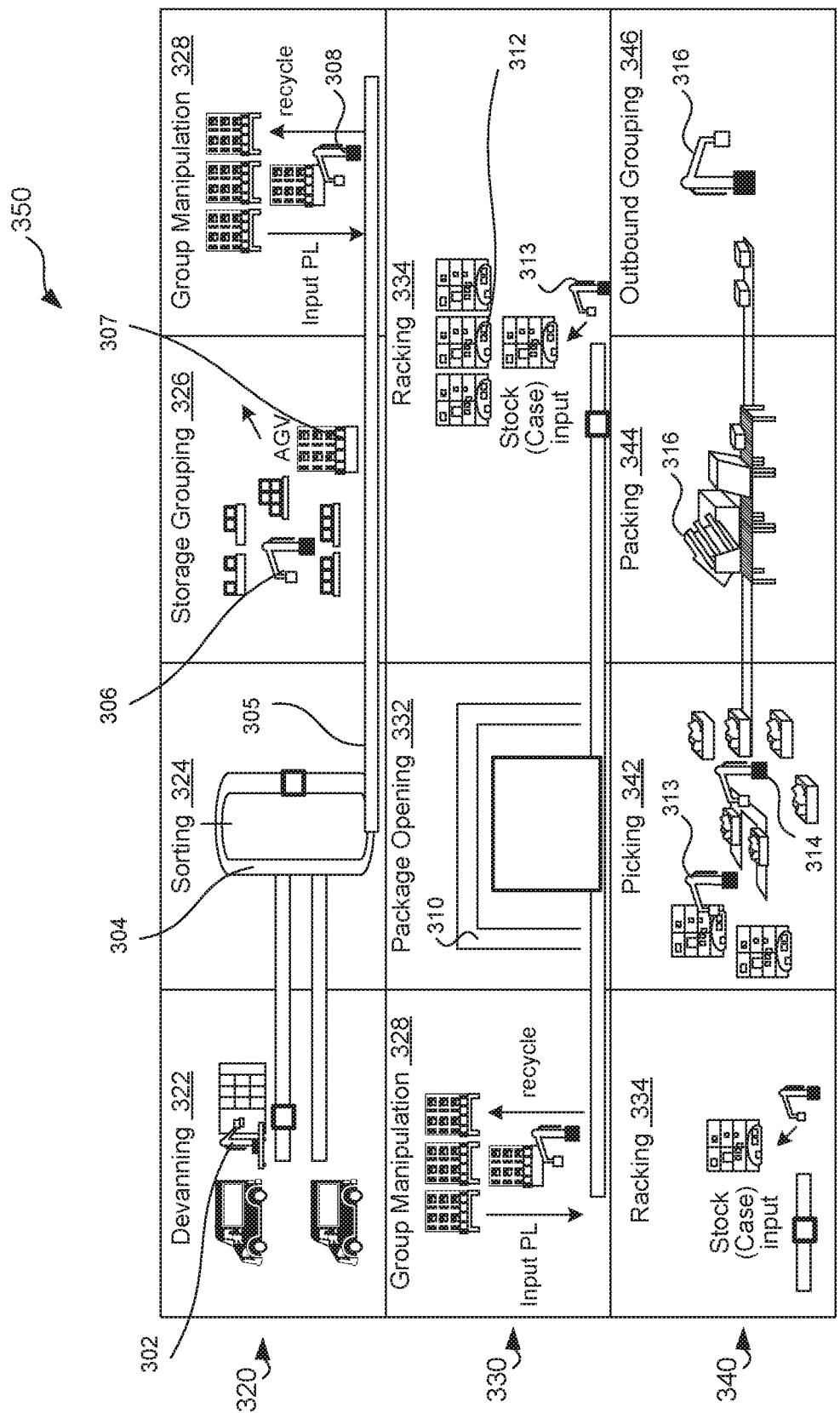
FIG. 3 is an illustration of example task units associated with the robotic system of FIG. 1 in accordance with one or more embodiments of the present technology.

FIG. 3 is an illustration of example task units associated with the robotic system 100 of FIG. 1 in accordance with one or more embodiments of the present technology. The robotic system 100 may include and/or be operably coupled to a set of robotic units configured to implement/execute one or more tasks. In some embodiments, the robotic units can include a devanning unit 302, a sorting unit 304, an object transport unit 305, a grouping unit 306, a group transport unit 307, a removing unit 308, a package opening unit 310, a rack transport unit 312, a shelving unit 313, a picking unit 314, a packing unit 316, or a combination thereof.

The devanning unit 302 can be a robotic unit configured to perform or execute a devanning task 322 by removing target objects from a carrier (e.g., a truck, an airplane, a ship, etc.). In some embodiments, the devanning unit 302 can include a package-level or a pallet-level robotic arm and/or a lift for lifting the target objects and/or their containers (e.g., pallets and/or other shipping containers). The devanning unit 302 can also include a transport system, such as wheels, tracks, rails, etc., configured to move the robotic arm and/or the lift relative to the carrier.

The sorting unit 304 can be a robotic unit configured to perform a sorting task 324 by placing or sending each of the incoming objects to designated locations/tasks associated with the object and/or according to a sequence. In some embodiments, the sorting unit 304 can include a transfer mechanism (e.g., a conveyor) that moves the devanned target objects along a path, such as from the devanning unit 302 and through/across a manipulation mechanism. The manipulation mechanism can include robotic units and/or sensors configured to recognize and manipulates individual objects on the path according to the recognition results. For example, the manipulation mechanism (e.g., a package-level robotic arm) can transfer and place the objects at different locations on or outside of the conveyor to form targeted groupings of objects and/or targeted sequence of objects. Also, the manipulation mechanism can transfer the objects from the path to one of the object transport units 305 associated with or assigned to the recognized object.

The object transport unit 305 can be a robotic unit operably coupled to the sorting unit 304 and configured to transfer objects between stations/tasks. For the example illustrated in FIG. 3, the object transport unit 305 can transfer the sequenced/grouped objects resulting from the sorting task 324 to be further processed for other tasks and the related units/stations (e.g., locations or areas associated with the tasks and the related units) described below. The object transport unit 305 may include a conveyor, a track, and/or a set of locomotive transfer units.

The grouping unit 306 can be a robotic unit configured to perform a storage grouping task 326 by grouping at least a subset of the objects, such as according to categories, types, orders, and/or shipping manifest, to form grouped sets of the objects. For example, the robotic system 100 can control the grouping unit 306 to palletize the incoming objects according to brand, manufacturer, identifier, size, weight, and/or another category. In other words, a warehouse may receive many different types of packages. Also, the shipped/received groupings of packages may have quantities or packing configurations that deviate from targeted storage quantities or configurations. Accordingly, the robotic system 100 can redistribute the received packages into new groupings that match the targeted storage groupings, quantities, and/or packing configurations. Each resulting groupings may include corresponding objects placed on or in containers (e.g., pallets or bins). Accordingly, for storage purposes, the containers may be categorized according to the associated object groupings. In some embodiments, the robotic system 100 may categorize the containers as having a single homogenous grouping of objects (e.g., same brand, same identifier, etc.) and/or having multiple or mixed groupings of objects.

In some embodiments, the storage grouping task 326 can include a grouping of two or more subtasks. The subtasks may include (1) transferring or loading empty grouping mechanisms (e.g., pallets or bins) to designated areas, (2) transferring the incoming objects from the object transport unit 305 to the grouping areas/mechanisms (e.g., pallets or bins) that correspond to the types or the instances of the objects, and/or (3) transferring the loaded grouping mechanism to a designated location. Accordingly, the grouping unit 306 can include a palletizing robot, such as a package-level robotic arm configured to manipulate boxes or packages. The palletizing robot may grip and lift the objects on the object transport unit 305 and place/stack them on pallets located at designated areas. Also, the group transport unit 307 can be a robotic unit configured to move the grouped objects, such as between palletizing locations and other processing locations (e.g., depalletizing locations and/or storage locations). For example, the group transport unit 307 can include a locomotive robotic unit, such as an Automated Guided Vehicle (AGV), that is configured to pick up and transport the grouping mechanisms and/or the objects thereon.

The removing unit 308 can be a robotic unit configured to perform a group manipulation task 328 by rearranging groupings of objects, such as for adjusting storage groupings and/or for forming outbound object groupings. The group manipulation task 328 can be for accessing the object groupings from the initial storage location and placing them at task stations. For example, the removing unit 308 can include a depalletizing unit, such as a package-level robotic arm configured to manipulate boxes or packages and remove them from an initial grouping (by, e.g., removing them from a first pallet) and placing them at one or more different locations (e.g., a second pallet or another conveyor) for storage.

As an illustrative example of the group manipulation task 328, the group transport unit 307 (e.g., the AGV) can bring the pallet and the objects stored thereon from the storage location to a depalletizing location. The depalletizing unit can transfer the objects from the pallet to another location for restorage or other processing as described below.

In some embodiments, the devanning task 322, the sorting task 324, and/or the storage grouping task 328 can be sequenced to form a receiving operation 320. The receiving operation 320 can be for receiving objects from an external provider or source for subsequent processing (e.g., grouping and/or storage). For example, the receiving operation 320 can be for receiving, unloading, and/or storing incoming objects, such as from manufacturers, warehouses, shipping hubs, distributors, etc.

In one or more embodiments, the group manipulation task 328 can be further utilized for different operations. For example, the robotic system 100 can implement a stocking operation 330 that includes the group manipulation task 326. The stocking operation 330 can include a sequence of tasks for manipulating, storing, and/or accessing contents of objects to relocate a task target for further storage or for subsequent tasks. In other words, the receiving operation 320 can manipulate the boxes and/or packages for storage and access, and the stocking operation 330 can manipulate the contents within the boxes and/or packages for storage and access.

The stocking operation 330 may also include other tasks, such as a package opening task 332 and/or a racking task 334. The package opening unit 310 (e.g., a robotic unit) can be configured to perform the package opening task 332 by opening the container, such as boxes or packaging material, forming or surrounding the object. In some embodiments, the package opening unit 310 can be configured to remove or cut package fasteners (e.g., tape, binding, etc.) and/or open coverings (e.g., box flaps, plastic wrappings, lids, etc.). In other embodiments, the package opening unit 310 can be configured to remove a top portion of the package, such as by cutting and removing a top portion/surface of the package to form an open-top bin and expose items therein. Similarly, the rack transport unit 312 (e.g., a robotic unit, such as an AGV) and/or the shelving unit 313 (e.g., a package-level robotic arm and/or a specialized AGV) can be configured to perform the racking task 334. The racking task 334 can be for placing the objects/bins on a storage rack and/or for accessing and removing objects/bins from the storage rack. The racking task 334 can include a rack picking task for removing the object/bins and transporting them to a different location. The rack transport unit 312 can be configured to transport storage racks between storage locations and loading/unloading locations. The shelving unit 313 can be configured to place the objects (e.g., the received objects and/or the opened objects) on the storage racks and/or remove the objects from the storage racks.

Similar to the group manipulation task 328, the racking task 334 can be further utilized for different operations. For example, the robotic system 100 can implement a shipping operation 340 that includes the racking task 334. The shipping operation 340 can include a sequence of tasks for grouping objects and/or individual items initially in storage or a different location for outbound transport or shipment. In other words, the receiving operation 320 can manipulate the boxes, packages, and/or content items and group them according to orders or shipping manifest. The grouped objects/items can be subsequently loaded to a transport vehicle and/or shipped to a remote location/facility separate from the storage locations.

The shipping operation 340 may also include other tasks, such as a picking task 342, a packing task 344, and/or an outbound grouping task 346. A set of robotic units including the removing unit 308, the shelving unit 313, and/or the picking unit 314 (e.g., an item-level robotic arm) may be configured to perform the picking task 342 by accessing and manipulating content items stored/received within objects, such as boxes or packages. For example, the shelving unit 313 and/or the removing unit 308 may be configured to perform a sub-task by placing storage containers (e.g., the opened boxes) at processing locations. The picking unit 314 (e.g., a robotic arm with a picking end-effector) may grip and transfer the content items from the storage containers to outbound containers (e.g., other boxes or packages), such as according to orders and/or shipping manifest.

The packing unit 316 may be configured to perform the packing task 344 by enclosing the content items and/or the objects for outbound transfer. For example, the packing unit 316 can include a robotic unit configured to close flaps or lids of the outbound containers, fasten the flaps/lids (via, e.g., tape, fastener, and/or adhesive), wrap the individual outbound containers, or a combination thereof.

The packing unit 316 (e.g., a package-level robotic arm) may be configured to perform the grouping task 346 by placing the packed/enclosed outbound containers at designated locations. For example, the packing unit 316 can load a pallet with a group of outbound containers intended for the same vehicle and/or destination location. In some embodiments, the grouping task 346 may include an additional sub-task to fasten the grouped containers, such as by wrapping the set of objects with a plastic wrap. A robotic unit (not shown) similar to the packing unit 316 and/or the AGV may be configured to apply the plastic wrap to the stacked/palleted outbound containers.

For illustrative purposes, the operations have been described with example task sequences shown in FIG. 3. However, it is understood that the operations and/or the tasks may be different. For example, the receiving operation 320 can include the package opening task 332 and/or the racking task 334. Additionally or alternatively, the receiving operation 320 may further exclude the sub-tasks performed by the group transport unit 307, and instead, the objects may be placed on the object transport unit 305 for further processing. Accordingly, the receiving operation 320 may transition from package-level manipulations to item-level operations and store open containers on racks.

Also, as an illustrative example, the shipping operation 340 can include the package opening task 332 after the racking task 334. In other words, the incoming objects may be stored without opening the objects, such as described above for the package-level receiving operation 320. The individual content items may be manipulated and packed as part of the shipping operation 340. Accordingly, the robotic system 100 may bring the stored packages to picking areas by implementing the racking task 334 and open the packages by executing the package opening task 332 before the picking task 342.

As a further illustrative example, the shipping operation 340 may include package-level processing. In other words, the incoming objects may be stored without opening the objects as described above. The stored objects may be regrouped onto outbound pallets according to order, vehicle, and/or destination location without the item-level manipulations. Accordingly, the package-level outbound grouping task may include the group manipulation task 328 followed by the outbound grouping task 346.

Example Task/Operation Organization

Figure 4:
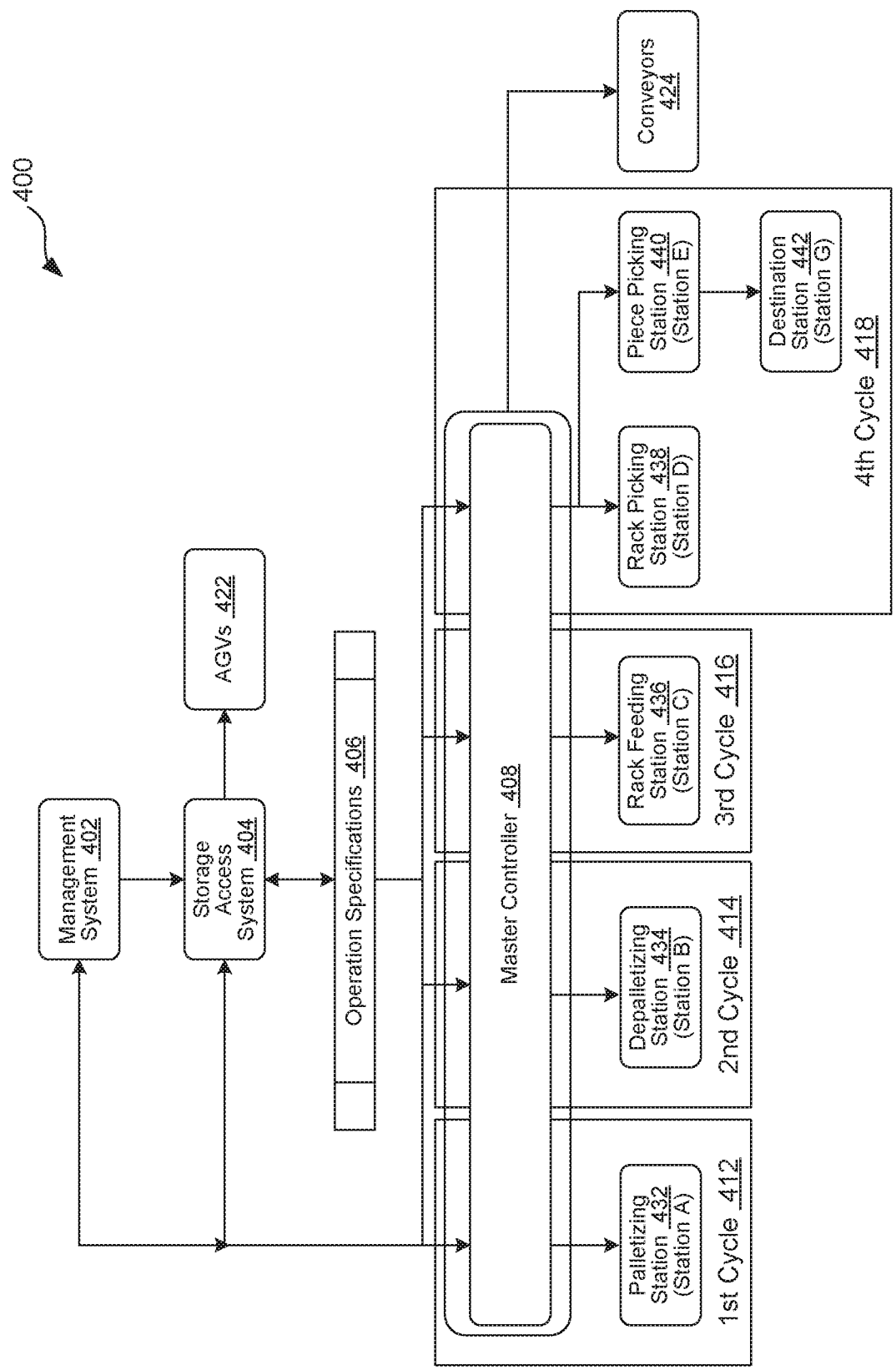
FIG. 4 is an illustration of an example control diagram for the robotic system of FIG. 1 in accordance with one or more embodiments of the present technology.

FIG. 4 is an illustration of an example control diagram for the robotic system 100 of FIG. 1 in accordance with one or more embodiments of the present technology. The control diagram can illustrate an overall architecture for the robotic system 100 and/or the corresponding components. In some embodiments, for example, the robotic system 100 can be implemented via a management system 402, a storage access system 404, a master controller 408, one or more robotic units, and/or other control systems. In other words, the robotic system 100 may be implemented based on operating the one or more processors 202 of FIG. 2 included in the management system 402, the storage access system 404, the master controller 408, the one or more robotic units, and/or the other control systems. As described above, the one or more processors 202 may execute computer-executable instructions stored in the storage devices 204 of FIG. 2. The storage devices 204 may be included in the management system 402, the storage access system 404, the master controller 408, the one or more robotic units, and/or the other control systems.

In other embodiments, for example, the robotic system 100 can be implemented via the management system 402 and/or the master controller 408 and interface with the storage access system 404, the one or more robotic units, and/or other control systems. For example, the one or more processors 202 may execute the computer-executable instructions and communicate (e.g., via the communication bus and/or the communication devices 206 of FIG. 2) commands, settings, plans, etc. with the storage access system 404, the one or more robotic units, and/or other control systems to execute the tasks and/or the operations.

The management system 402 can include a set of computing devices (e.g., the one or more processors 202, the storage devices 204, and/or portions thereof) configured to manage overall states/conditions of a corresponding location/site. For example, the management system 402 can include servers, specialized controllers, desktop computers or portals, and/or other personal or commercial computing devices configured to function as a control/management system for a warehouse, a shipping hub, a distribution center, etc. The management system 402 may be located at or in the corresponding location or at a remote location.

The robotic system 100 can control transport objects between task stations so that the tasks associated with the stations may be performed for the transported objects. In controlling the transport, for example, the management system 402 and/or the master controller 408 may generate timing factors (e.g., flags) and/or communicate the timing factors to the storage access system 404. The storage access system 404 can implement one or more motion plans or portions thereof to operate the transport units according to the timing factors from the management system 402 and/or the master controller 408. The storage access system 404 can include a set of computing devices (e.g., the one or more processors 202, the storage devices 204, and/or portions thereof) configured to control transport units, such as AGVs 422. For example, the storage access system 404 can include servers, specialized controllers, desktop computers or portals, and/or other personal or commercial computing devices configured to control movements or functions of the group transport units 307 of FIG. 3 and/or the rack transport units 312 of FIG. 3.

The master controller 408 can include a set of computing devices (e.g., the one or more processors 202, the storage devices 204, and/or portions thereof) configured to control local operations of specific robotic units and/or the tasks performed by the specific robotic units. The master controller 408 can include servers, specialized controllers, desktop computers or portals, and/or other personal or commercial computing devices configured to analyze sensor data, determine current or real-time conditions, and/or derive and implement motion plans for implementing the tasks.

As an illustrative example, the master controller 408 may receive sensor data representative of objects at the task start location 114 of FIG. 1 and identify the incoming object and/or physical attributes thereof (e.g., dimensions, visual appearances, and/or corner/edge locations). The master controller 408 can use the identification results to determine the task location 116 of FIG. 1 and the corresponding motion plan (e.g., a set of commands and/or settings corresponding to a planned path of travel) for transferring the object thereto from the start location 114. The master controller 408 can implement the motion plan based on communicating the motion plans or the corresponding commands/settings to the corresponding robotic units. The robotic units can execute the commands/settings to perform the tasks or the sub-tasks. In some embodiments, the master controller 408 may control conveyors 424 (e.g., instances of the object transport unit 305 of FIG. 3) and/or the sorting unit 304 of FIG. 3. The master controller 408 may also control one or more robotic units illustrated in FIG. 3, such as the devanning unit 302, the grouping unit 306, the removing unit 308, the package opening unit 310, the shelving unit 313, the picking unit 314, and/or the packing unit 316.

The management system 402, the storage access system 404, and/or the master controller 408 may be configured to control the corresponding tasks/operations based on operation specifications 406. In some embodiments, the management system 402 may be configured to generate the operation specifications 406 based on information regarding incoming objects, currently stored objects, and/or outgoing orders or shipping manifest. The operation specifications 406 can include details, rules, objectives, timings, and/or interfaces associated with implementations of the tasks/ operations. For example, the operation specification 406 can include current quantities and/or storage locations of objects and/or items within the managed site. Also, the operation specification 406 can include grouping or processing locations (e.g., for the sorting unit 304), storage locations and/or storage container/pallet identifications for incoming/received objects and/or reorganized objects/items. Further, the operation specification 406 can include information for grouping objects/items for storage and/or outbound shipping.

In some embodiments, the management system 402 may use the operation specifications 406 to coordinate timings for and/or interactions between the tasks to perform the operations. The management system 402 can derive and/or implement commands, settings, and/or plans for the tasks according to the timings and/or the interactions. In other embodiments, the management system 402 may communicate the operation specifications 406 to the master controller 408, the storage access system 404, and/or other control devices/systems. The master controller 408, the storage access system 404, and/or other control devices/systems can use the operation specifications 406 to derive and/or implement commands, settings, and/or plans for the tasks.

In some embodiments, the tasks and/or the operations may be performed at different locations within the managed site. Each task and/or operation may correspond to a production cycle executed at a corresponding station. For example, the robotic system 100 can control the tasks/ operations that correspond to a first production cycle 412, a second production cycle 414, a third production cycle 416, and/or a fourth production cycle 418. In some embodiments, the first production cycle 412 may correspond to a task, an operation, and/or a portion thereof performed at a palletizing station 432 by one or more associated robotic units. Similarly, the second production cycle 414 may correspond to a depalletizing station 434, and the third production cycle 416 may correspond to a rack feeding station 436. The fourth production cycle 418 may similarly correspond to a rack picking station 438, a piece picking station 440, and/or a destination station. Details of the production cycles and the stations are described below.

Figure 5A:
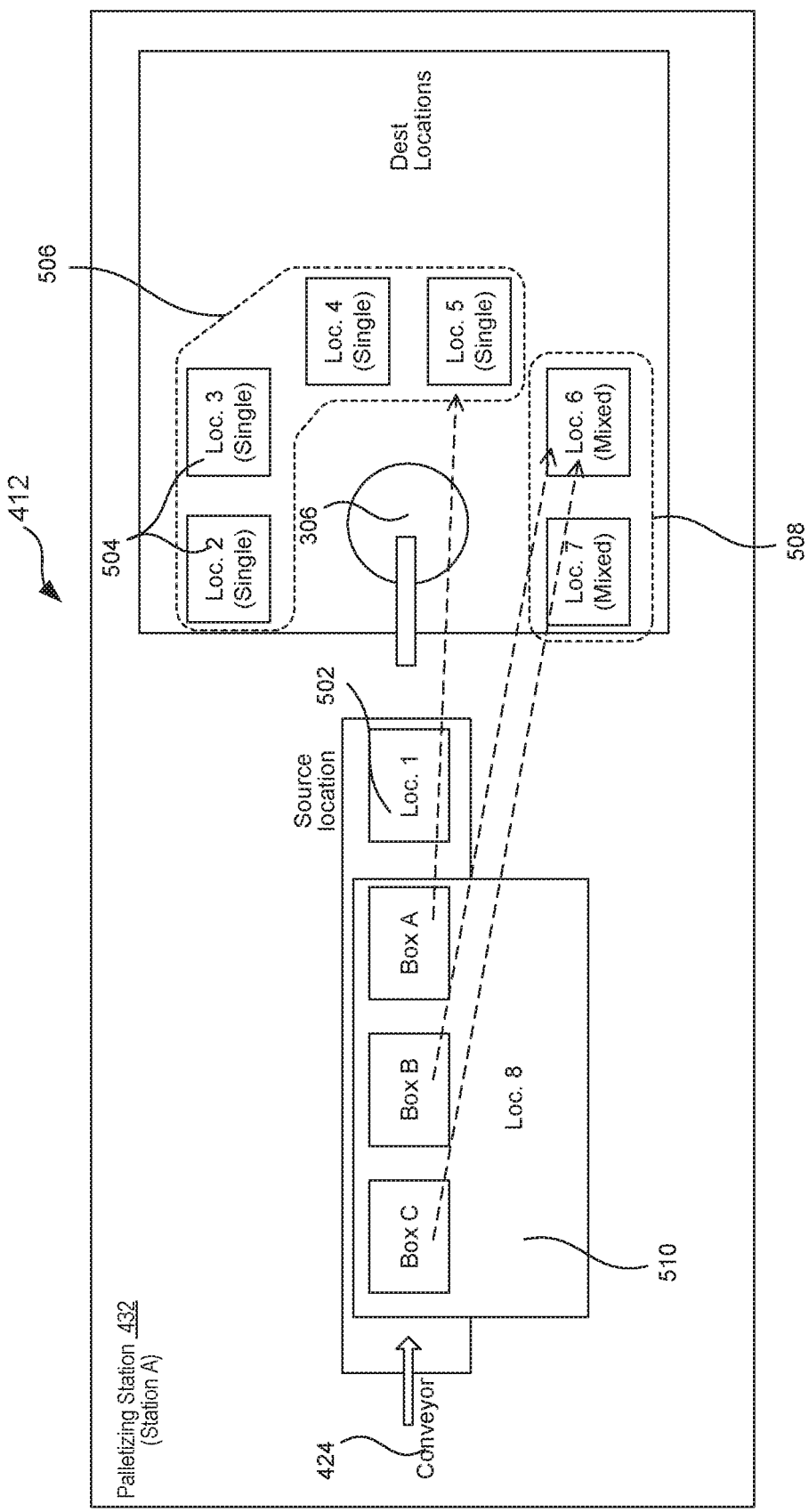
FIG. 5A is an illustration of a first example task station in accordance with one or more embodiments of the present technology.

FIG. 5A is an illustration of a first example production cycle (e.g., the first production cycle 412) in accordance with one or more embodiments of the present technology. Accordingly, FIG. 5A illustrates an example layout and/or function of the palletizing station 432. In some embodiments, the palletizing station 432 can be configured to perform the storage grouping task 326 of FIG. 3. Accordingly, the palletizing station 432 may include the grouping unit 306 (e.g., a palletizing unit including a robotic arm with a corresponding end-effector).

The palletizing station 432 may include a source location 502 and one or more destination locations 504 (e.g., pallet locations). The source location 502 can include a location where the grouping unit 306 receives and/or picks up incoming objects. For the example illustrated in FIG. 5A, the source location 502 can correspond to an end portion of an ingress instance of the conveyor 424 (e.g., an instance of the object transport unit 305 of FIG. 3) nearest to the grouping unit 306. The destination locations 504 can each be a placement location for a grouping of objects. Object containers, such as bins and/or pallets, may be placed at the destination locations 504 to receive the object groupings. The destination locations 504 and/or the source location 502 can be predetermined or spatially fixed relative to the grouping unit 306. In some embodiments, the destination locations 504 and/or the source location 502 can be arranged around (e.g., at least partially encircling) and/or within a lateral operating distance associated with the grouping unit 306.

In some embodiments, the palletizing station 432 may include different types of the destination locations 504, such as single-load locations 506 and/or mixed-load locations 508. Each of the single-load locations 506 can be designated for loading/grouping a single type of objects. In other words, the robotic system 100 can place one type of objects on the pallet placed at each of the single-load locations 506. Each of the mixed-load locations 508 can be designated for loading/grouping multiple different types of objects. In other words, the robotic system 100 can place multiple types of objects on the pallet placed at each of the mixed-load locations 508.

In some embodiments, the mixed-load locations 508 and the single-load locations 506 may be predetermined and/or fixed. In other embodiments, the robotic system 100 can dynamically (e.g., during run-time and/or according to real-time conditions or processing results) assign a type to each of the destination locations 504. For example, the robotic system 100 (via, e.g., the management system 402 of FIG. 4 and/or the master controller 408 of FIG. 4) can adjust quantities and/or locations of the single-load locations 506 and/or the mixed-load locations 508 according to real-time conditions. In one or more embodiments, the robotic system 100 can assign identifiers to containers and/or the corresponding destination locations 504 that specify the assigned type.

The palletizing station 432 can include a prediction queue 510 used to determine a sequence of the incoming objects. The prediction queue 510 can include one or more sensors (e.g., two-dimensional (2D) and/or three-dimensional (3D) sensors) configured to image one or more objects as they move towards the source location 502. The prediction queue 510 may also include a holding area located before the source location 502 that is configured to maintain or house a predetermine number of objects. Accordingly, the robotic system 100 can use the prediction queue 510 to determine identities of predetermined number of objects that will sequentially arrive at the source location 502.

As an illustrative example of the first production cycle 412 (e.g., the storage grouping task 326), the robotic system 100 may obtain a sequence of the incoming boxes. The robotic system 100 (e.g., the management system 402 and/or the master controller 408) may obtain the sequence from a manifest for a received shipment, processing results or status information from the devanning unit 302 of FIG. 3 and/or the sorting unit 304 of FIG. 3. The robotic system 100 may also obtain the information by determining the incoming sequence using the prediction queue 510. The robotic system 100 (e.g., the management system 402, the storage access system 404, and/or the master controller 408) can assign each of the incoming objects to one of the destination locations 504 according to grouping criteria (e.g., type, brand, object identification, etc.).

Continuing with the illustrative example, the master controller 408 and/or the management system 402 can request the storage access system 404 to assign a container (e.g., a pallet) and a destination location for each of the grouping criteria that corresponds to the incoming objects. Accordingly, the storage access system 404 can provide a container identifier (e.g., a pallet identifier) and/or a destination location for an incoming object.

When a container is not currently present at the assigned location, the master controller 408 and/or the management system 402 can provide a move-in trigger (MoveIn) to the storage access system 404 to bring a container to one of the destination locations 504. Based on the move-in trigger, the storage access system 404 can control the AGV 422 of FIG. 4 to bring the container to the assigned destination location 504. The AGV 422 can provide current location and/or placement status (e.g., task completion status) to the storage access system 404 after placing the container at the assigned location. The storage access system 404 can notify the master controller 408 and/or the management system 402 accordingly.

With the container in place, the master controller 408 and/or the management system 402 can control the grouping unit 306 to pick up the object from the source location 502 and transfer it to the assigned destination. For example, the master controller 408 and/or the management system 402 can derive and/or communicate motion plans and/or corresponding commands/settings to the grouping unit 306. The grouping unit 306 can execute the received information to grip, lift, horizontally transfer, lower, and release the object to place the object at the assigned destination. The grouping unit 306 may communicate a placement status or a task completion status to the master controller 408 and/or the management system 402 after transfer of one or more objects. The master controller 408 and/or the management system 402 can also communicate a placement status or a task completion status to the storage access system 404. The storage access system 404 can track the quantity of objects placed in each container based on the status updates.

Once a targeted quantity of objects has been placed on a container during the first production cycle 412, the master controller 408 and/or the management system 402 can provide a move-out trigger (MoveOut) to remove the container from the corresponding destination location. Based on the move-out trigger, the storage access system 404 can control the AGV 422 to bring the container from the destination location to a subsequent processing location, such as a depalletization station, a storage location, etc. provided by the master controller 408 and/or the management system 402. The robotic system 100 can repeat the above processes until all of the incoming objects have been grouped or no further incoming objects are expected.

Figure 5B:
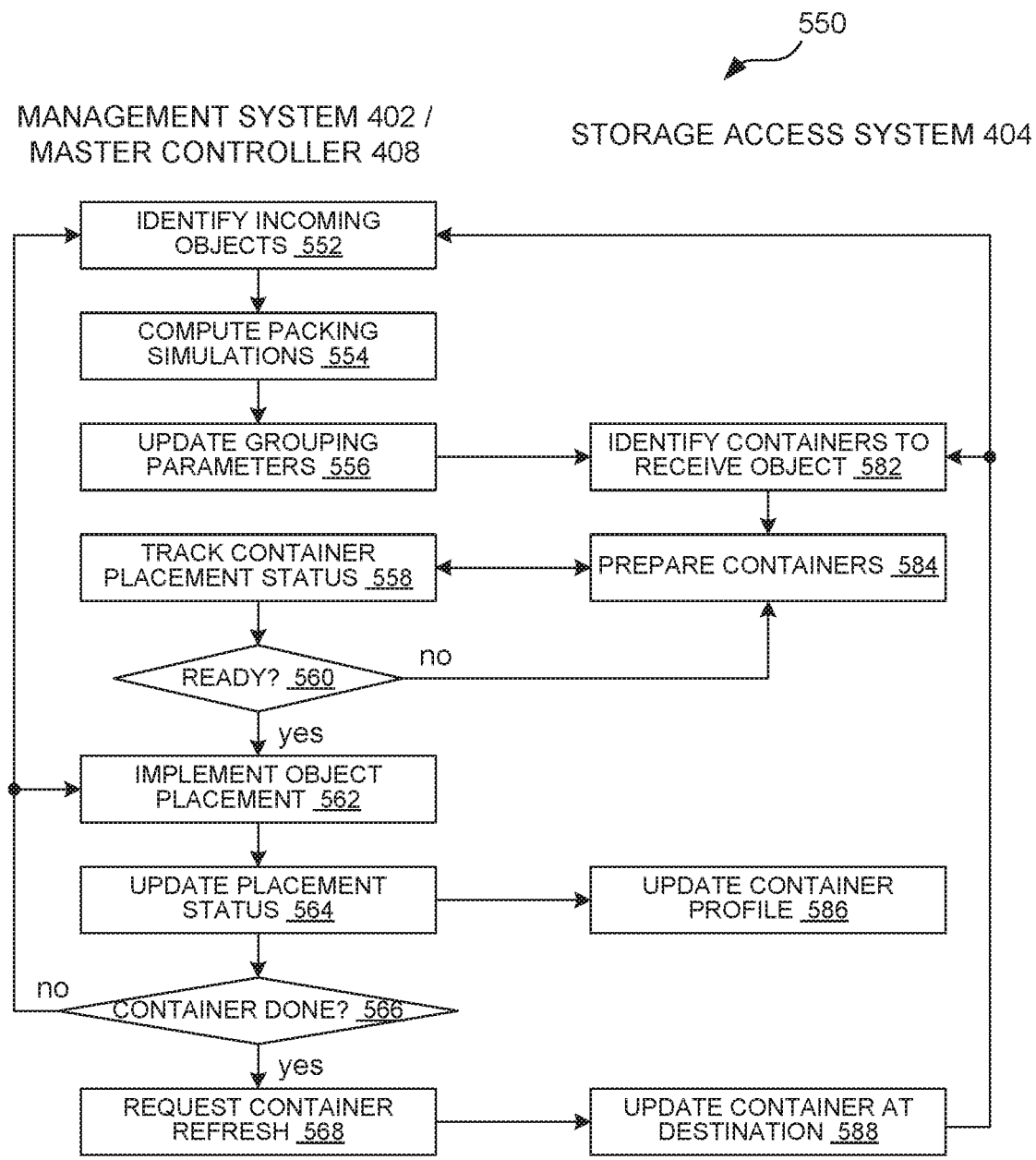
FIG. 5B is a flow diagram for a method of operating the robotic system of FIG. 1 in accordance with one or more embodiments of the present technology.

FIG. 5B is a flow diagram for a method 550 of operating the robotic system 100 of FIG. 1 in accordance with one or more embodiments of the present technology. The method 550 can be for implementing the first production cycle 412 of FIG. 4 (e.g., the storage grouping task 326 of FIG. 3). The method 550 can be implemented based on executing the instructions stored on one or more of the storage devices 204 of FIG. 2 with one or more of the processors 202 of FIG. 2. Accordingly, the one or more processors 202 may implement operations (by, e.g., generating/sending commands, settings, and/or plans) to control one or more units (e.g., the grouping unit 306 of FIG. 3, the group transport unit 307 of FIG. 3 such as the AGVs 422 of FIG. 4, the sensors 216 of FIG. 2, etc.) and/or components therein.

As an illustrative example, the processes illustrated on the left in FIG. 5B may be performed by one or more overseeing devices (e.g., the management system 402 and/or the master controller 408) that coordinate the operations/tasks for a grouping of systems, subsystems, and/or devices. The processes illustrated on the right in FIG. 5B may be performed by the storage access system 404. Accordingly, the method 550 can illustrate the interactions between the various devices/subsystems for the robotic system 100.

At block 552, the one or more overseeing devices can identify incoming objects. As an illustrative example, the master controller 408 and/or the management system 402 can identify incoming objects associated with a palletizing task of a corresponding operation. The master controller 408 can receive sensor output data (e.g., 2D/3D images) from one or more sensors associated with the prediction queue 510 of FIG. 5A. The master controller 408 and/or the management system 402 can compare the sensor output data to the master data 252 of FIG. 2 that includes dimensions, surface images, identifier information, and/or other distinguishable physical attributes of known/registered objects. The master controller 408 and/or the management system 402 can identify or recognize the objects located in the prediction queue 510 accordingly. In some embodiments, the master controller 408 and/or the management system 402 can estimate the identity of the object and/or measure dimensions of the objects in real-time when the compared aspects of the object are not found in the master data 252.

At block 554, the one or more overseeing devices can compute a packing simulation for the incoming objects. For example, the master controller 408 and/or the management system 402 can compute the packing simulations for grouping the objects according to one or more grouping conditions. The master controller 408 and/or the management system 402 may obtain physical dimensions (e.g., length, width, and/or height), weight, CoM, and/or other information regarding the identified objects. The master controller 408 and/or the management system 402 can compute the packing simulation by deriving placement locations within the container and/or motion plans for placing the object in the container To derive the placement locations, the master controller 408 and/or the management system 402 can determine targeted grouping goals according to a set of predetermined rules/processes. For example, the master controller 408 and/or the management system 402 may determine test placement locations as predetermine location on the container (e.g., peripheral locations and/or center locations). The master controller 408 and/or the management system 402 can derive motion plans and/or travel paths for transferring the object from the source location 502 to the test placement locations for containers placed at one or more of the destination locations 504. The master controller 408 and/or the management system 402 can evaluate the resulting motion plans, such as according to path length, number of maneuvers or direction changes, obstacles, collision likelihoods, and/or other operational criteria. The master controller 408 and/or the management system 402 can also evaluate the stacking/packing arrangements for the containers to determine targeted capacities that satisfy stability and/or stacking requirements. For example, the master controller 408 and/or the management system 402 can simulate various packing/stacking configurations of the objects to achieve an arrangement according to maximum quantity, targeted arrangement, and/or maximum stack height.

At block 556, the one or more overseeing devices can update grouping factors. The grouping factors can include flags, data, commands, and/or status information that represent the container requirements for packing/storing the incoming objects. Some examples of the grouping factors may include: flags for beginning preparation of the container (by, e.g., picking up empty or designated/partially-filled containers), an object category associated with the incoming object and/or the container, single/mixed designation for the container, and/or packing limits/capacity for the container. The master controller 408 and/or the management system 402 can communicate the information to the storage access system 404. For example, the master controller 408 and/or the management system 402 can notify the storage access system 404 to prepare the target storage containers (e.g., pallets) to receive the incoming objects.

At block 582, the storage access system 404 can identify the containers that will receive the object based on the received grouping factors. In some embodiments, the storage access system 404 can set a flag that indicates that preparation activities are being performed by the storage access system 404 and/or the AGVs 422. The storage access system 404 can determine current location of the containers and/or identifiers and/or types (e.g., single/mixed) of the containers required for the packing plan. The storage access system 404 may determine the locations/identifiers by considering the identifiers/types of containers in storage and/or currently at the destination locations 504 of FIG. 5A.

As an illustrative example, the storage access system 404 may determine the container identifiers as the container already at the single-load location 506 of FIG. 5A when that container corresponds to the identified incoming object and is available to receive additional objects. Also, the storage access system 404 may determine the container identifiers as the container already at the mixed-load location 508 of FIG. 5A when they are designated to receive a mix of objects including the currently available object. When multiple corresponding containers are at the destination locations, the storage access system 404 can determine the container identifier of the container having lower quantity of objects therein. When no containers (e.g., single and or mixed) at the destination locations 504 correspond to the identified incoming object, the storage access system 404 can assign the stored container that includes the smallest quantity of the objects and/or is closest to the grouping unit 306 to receive the incoming object.

At block 584, the storage access system 404 can prepare containers to receive the objects. The storage access system 404 can control the AGVs 422 to access and transfer the assigned/identified container to one of the destination locations 504 or a waiting location for temporary storage. For example, the storage access system 404 can identify an unoccupied AGV that is nearest to the storage location of the identified container. The storage access system 404 can command the identified AGV to pick up the identified container and provide the current storage location of the container and a desired target location (e.g., the waiting area or the one of the destination locations 504). The storage access system 404 can track the status of the AGV and update the flag to indicate that the operations/tasks associated preparation activities are complete when the AGV arrives at the targeted location.

At block 558, the one or more overseeing devices can track the container placement status. For example, the master controller 408 and/or the management system 402 can receive container information (e.g., pallet identifiers) representative of the containers prepared by the storage access system 404 to receive the incoming objects. When the storage access system 404 updates the flag to indicate that operations/tasks associated with the preparation activities are complete, the master controller 408 and/or the management system 402 can determine a location for the container according to the packing simulation. The master controller 408 and/or the management system 402 can communicate the container identifier, the determined destination location, and/or the MoveIn trigger to the storage access system 404 accordingly. In response, as illustrated at block 584, the storage access system 404 can control the AGV to move the container to the determined destination location. The storage access system 404 can update the resulting control status (e.g., location occupancy status, placement status and details of the container, and/or other related information for placing the container at the determined location).

At decision block 560, the one or more overseeing devices can determine whether the container is ready for receiving the object. For example, the master controller 408 and/or the management system 402 can monitor the control status of the storage access system 404 to determine whether the container is ready. The master controller 408 and/or the management system 402 can continue monitoring until the control status indicates that the containers have been placed at the designated destination location.

When the containers are ready, as illustrated at block 562, the one or more overseeing devices can implement object placement. The master controller 408 and/or the management system 402 can derive the motion plan as described above. In some embodiments, the master controller 408 and/or the management system 402 can derive or update the placement location and the corresponding motion plan in real-time. As an illustrative example, the master controller 408 can receive one or more 2D/3D images representative of the container placed at the designated destination location. The master controller 408 can process the received images, such as by determining height/depth values assigned to a grid system or a pixelated model of a placement surface in the container, to derive a placement location of the object. In some embodiments, the master controller 408 may adjust the motion plan that resulted from the packing simulation according to the placement location. In other embodiments, the master controller 408 may derive the object path and the corresponding motion plan according to the placement location as described above. The master controller 408 can implement the motion plan by communicating the motion plan and/or the corresponding commands and/or settings to the grouping unit 306. The grouping unit 306 can execute the receive information to transfer an end-effector (e.g., gripper) to the object, grip the object with the end-effector, lift and laterally transfer the object, place the object and/or release the object according to the motion plan.

At block 564, the one or more overseeing devices can update the object placement status. For example, the master controller 408 and/or the management system 402 can maintain a placement flag that indicates whether a particular object has been placed in the container. Also, the master controller 408 and/or the management system 402 can maintain a placement execution flag that indicates whether the grouping unit 306 is executing the motion plan to place an object in the container. After each placement, the master controller 408 and/or the management system 402 can determine other information regarding the placed object and/or the content of the container, such as an identifier for the newly placed object, a placement location of the newly placed object, an overall shape of the packed set of objects, and/or a quantity of objects in the container.

At block 586, the storage access system 404 can update a container profile based on the placement status. The storage access system 404 can monitor the placement flag and/or the execution flag to identify that the object has been placed in the container. When the object has been placed in the container, the storage access system 404 can update the container profile that includes details regarding the contents of the corresponding container. For example, the storage access system 404 can receive and store the content information from the master controller 408 and/or the management system 402 into the container profile. Also, the storage access system 404 can incrementally increase the object quantity based on the monitored status(es).

At decision block 566, the robotic system 100 can determine whether sub-tasks or sub-operations associated with the container performed at the destination location is complete. For example, the storage access system 404, the master controller 408, and/or the management system 402 can determine whether the container is full after placement of the object, such as by comparing the updated object quantity to the quantity limit determined by the packing simulation and/or a predetermined storage packing threshold. Also, the master controller 408 and/or the management system 402 can determine whether the container is necessary or targeted for placement of subsequent incoming objects. When the container is not full and/or targeted for subsequent placements, the master controller 408 and/or the management system 402 can continue placing the subsequently incoming objects (e.g., the next object in the prediction queue 510). The master controller 408 and/or the management system 402 can continue with the next placement by repeating the above-described processes, such as from block 552 and/or block 562.

When the container is full and/or does not correspond to the incoming objects, as illustrated at block 568, the master controller 408, and/or the management system 402 can direct the storage access system 404 to remove the container from the destination location, such as by setting the MoveOut flag. In other words, the robotic system 100 can determine that no subsequently incoming objects will likely be placed in the container. In response to such determination, the master controller 408 and/or the management system 402 can direct the storage access system 404 to remove the container from the destination location, such as by setting the MoveOut flag. In response, as illustrated at block 588, the storage access system 404 can control the AGV 422 to remove the container from the destination location. The storage access system 404 can control the AGV 422 to move to a different destination location, a different station, a waiting area, or a storage area according to other operational factors or real-time conditions.

In some situations, such as when the removed container was full and other instances of the same type of object remains in the prediction queue 510, the control flow may proceed to block 582. Accordingly, the storage access system 404 may subsequently identify another container to be placed in the newly opened destination location. The method 550 can proceed as described above to place the remaining objects in the updated container. In some other situations, the control flow can proceed to block 552 and repeat the above-described processes to place the subsequently incoming objects in the corresponding containers.

Figure 6A:
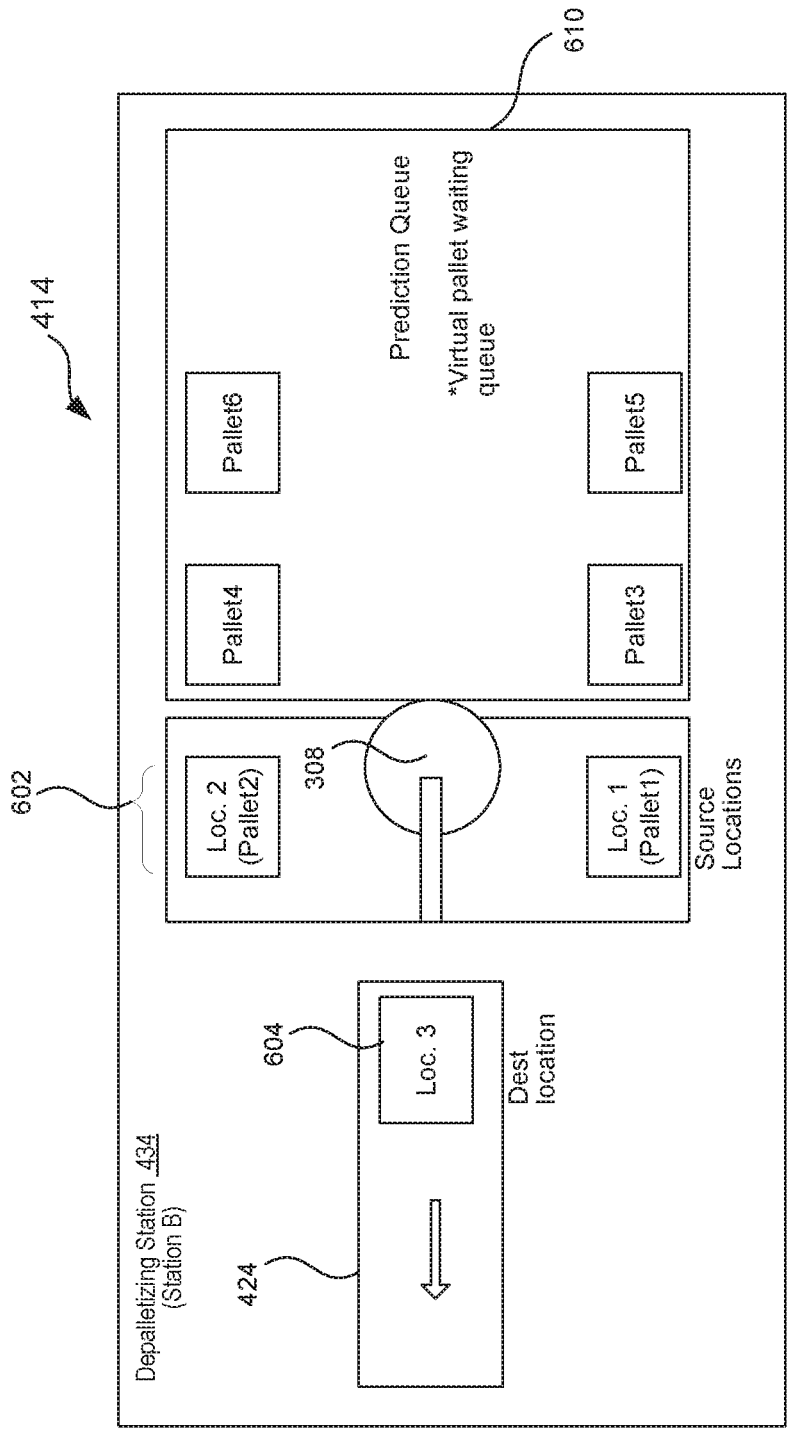
FIG. 6A is an illustration of a second example task station in accordance with one or more embodiments of the present technology.

FIG. 6A is an illustration of a second example production cycle (e.g., the second production cycle 414) in accordance with one or more embodiments of the present technology. Accordingly, FIG. 6A illustrates an example layout and/or function of the depalletizing station 434. In some embodiments, the depalletizing station 434 can be configured to perform the group manipulation task 328 of FIG. 3. Accordingly, the depalletizing station 434 may include the removing unit 308 (e.g., a depalletizing unit including a robotic arm with a corresponding end-effector).

The depalletizing station 434 can be similarly configured as the palletizing station 432 of FIG. 4 but for removing objects from containers instead of placing objects in the containers. For example, the depalletizing station 434 can include a set of source locations 602 where the removing unit 308 receives and/or picks from the containers (e.g., pallets) that include previously packed/stored objects. For the example illustrated in FIG. 6A, the source locations 602 can correspond to container and/or AGV placement areas. Also, the depalletizing station 434 can include one or more destination locations 604 configured to transfer the objects that are removed from (e.g., depalletized) the containers to a different location. In some embodiments, each of the destination locations 604 can include an end portion of an egress instance of the conveyor 424 (e.g., an instance of the object transport unit 305 of FIG. 3) nearest to the removing unit 308. The source locations 602 and/or the destination location 604 can be predetermined or spatially fixed relative to the removing unit 308. In some embodiments, the destination location 604 and/or the source locations 602 can be arranged around (e.g., at least partially encircling) and/or within a lateral operating distance associated with the removing unit 308.

The depalletizing station 434 can include a prediction queue 610 used to determine a set of the incoming containers and/or the corresponding objects. The prediction queue 610 can include one or more sensors (e.g., two-dimensional (2D) and/or three-dimensional (3D) sensors) configured to image the containers/objects as they move towards the source locations 602. The prediction queue 610 may also include a holding area located before the source locations 602 that is configured to maintain or house a predetermine number of containers at designated locations. Accordingly, the robotic system 100 can use the prediction queue 610 to determine identities, quantities, and/or locations of objects that will sequentially arrive at the source locations 602.

As an illustrative example of the second production cycle 414 (e.g., the group manipulation task 328), the management system 402 of FIG. 4 and/or the storage access system 404 of FIG. 4 can determine a trigger for reorganizing containers, such as for combining contents of partially-filled containers and/or for filling outgoing shipments. Accordingly, the management system 402 and/or the storage access system 404 can identify containers that are subject to the group manipulation task 328. The storage access system 404 can notify the management system 402 and/or the master controller 408 of FIG. 4 of the identified containers and/or control the AGVs 422 of FIG. 4 to place the identified containers in the prediction queue 610. The management system 402 and/or the master controller 408 can receive and/or obtain (via, e.g., sensors in the prediction queue 610) information regarding the identified containers and/or the objects therein. The management system 402 and/or the master controller 408 can derive and implement motion plans for transferring a targeted instances or quantity of objects from the set of the source locations 602 to the destination location 604. The management system 402 and/or the master controller 408 can generate and exchange coordination signals (e.g., MoveIn, MoveOut, and/or other signals) with the storage access system 404 for coordinating placement of the containers at the source locations 602.

Figure 6B:
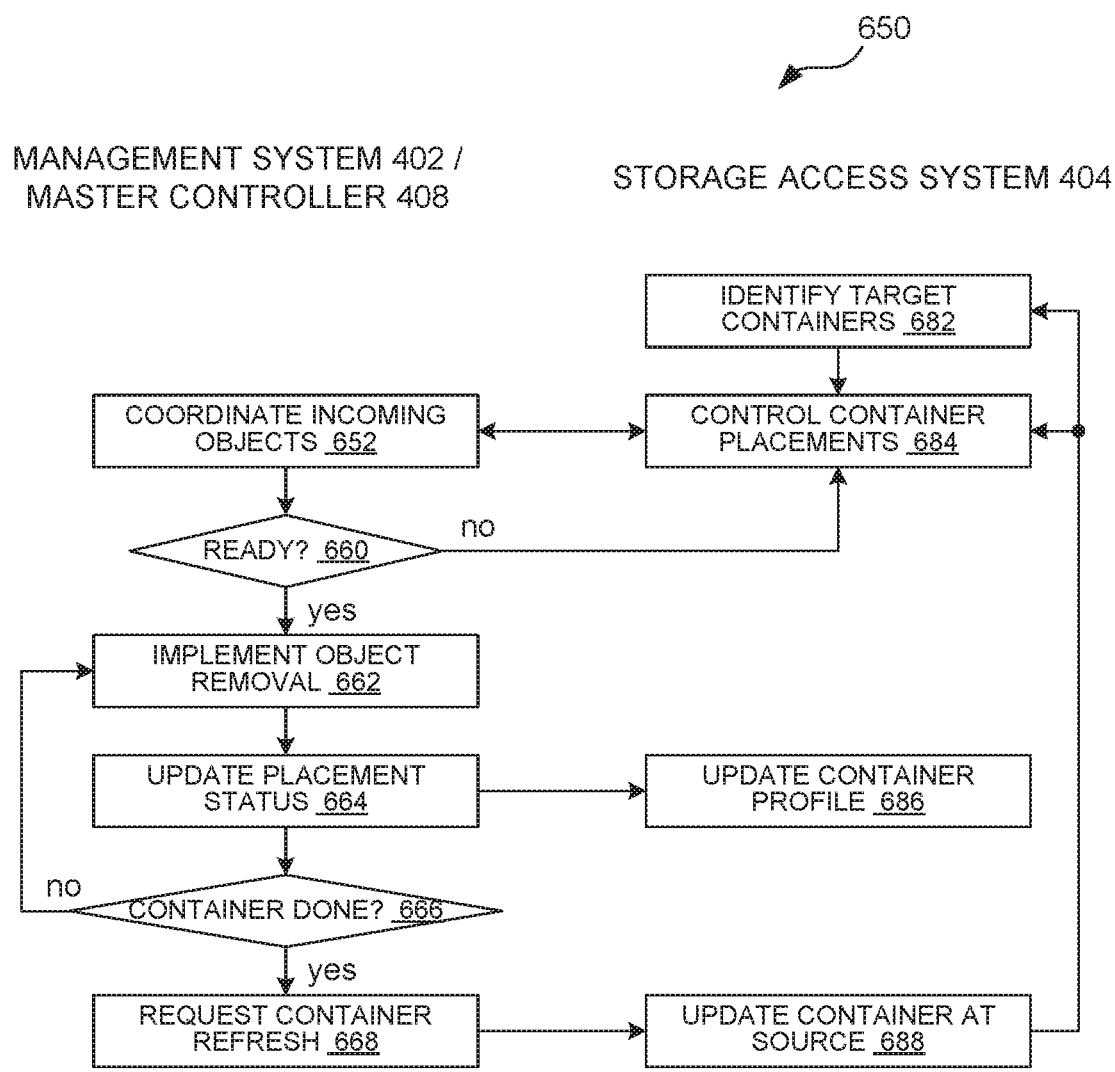
FIG. 6B is a flow diagram for a method of operating the robotic system of FIG. 1 in accordance with one or more embodiments of the present technology.

FIG. 6B is a flow diagram for a method 650 of operating the robotic system 100 of FIG. 1 in accordance with one or more embodiments of the present technology. The method 650 can be for implementing the second production cycle 414 of FIG. 4 (e.g., the group manipulation task 328 of FIG. 3). The method 650 can be implemented based on executing the instructions stored on one or more of the storage devices 204 of FIG. 2 with one or more of the processors 202 of FIG. 2. Accordingly, the one or more processors 202 may implement operations (by, e.g., generating/sending commands, settings, and/or plans) to control one or more units (e.g., the removing unit 308 of FIG. 3, the group transport unit 307 of FIG. 3 such as the AGVs 422 of FIG. 4, the sensors 216 of FIG. 2, etc.) and/or components therein.

As an illustrative example, the processes illustrated on the left in FIG. 6B may be performed by one or more overseeing devices (e.g., the management system 402 and/or the master controller 408) that coordinate the operations/tasks for a grouping of systems, subsystems, and/or devices. The processes illustrated on the right in FIG. 6B may be performed by the storage access system 404. Accordingly, the method 650 can illustrate the interactions between the various devices/subsystems for the robotic system 100.

At block 682, the storage access system 404 can identify target containers (e.g., containers in storage and/or at other task locations) for the group manipulation task. As an illustrative example, the one or more overseeing devices (e.g., the master controller 408 and/or the management system 402) can receive an outgoing shipping order and provide a list of objects or types thereof to the storage access system 404. The storage access system 404 can identify containers in storage that contains the specified objects (e.g., the objects included in the outgoing shipping order). When multiple containers include the specified objects, the storage access system 404 can select containers closest to the depalletizing station 434 and/or having a targeted/lowest/highest quantity of objects.

Also, the storage access system 404 can periodically (e.g., according to predetermined timing and/or after task completions) analyze the contents in the stored containers. The storage access system 404 can initiate object reorganization when a number of containers having partially-filled quantities (e.g., below max threshold capacity of the containers) exceed a predetermined reorganization threshold. The storage access system 404 can select the partially-filled containers for the group manipulation task 328.

At block 684, the storage access system 404 can control placement of the target containers at the source locations 602. The storage access system 404 can control the group transport unit 307 (e.g., the AGVs 422) to bring the identified containers from their current locations (e.g., storage locations and/or other task stations) to the depalletizing station 434. For example, the storage access system 404 can identify an available AGV closest to the identified containers. The storage access system 404 can send information (e.g., container identifier/location and/or the destination for the container) to the identified AGV to pick up and bring the container to the prediction queue 610 of FIG. 6A.

While controlling the placement of the containers, the storage access system 404 can update various statuses and/or information. For example, the storage access system 404 can set status flag(s) that indicate whether the containers have been placed in the prediction queue 610. The storage access system 404 can also provide the container identifier, placement location of the container within the prediction queue 610, type/identifier of the objects in the container, tracked quantity of the objects in the container, and/or placement positions of the objects in the container.

At block 652, the one or more overseeing devices can identify incoming objects. As an illustrative example, the master controller 408 and/or the management system 402 can receive the container information (e.g., pallet identifiers) and/or the corresponding incoming objects by the storage access system 404. The master controller 408 and/or the management system 402 can further receive sensor output data (e.g., 2D/3D images) from one or more sensors associated with the prediction queue 610. The master controller 408 and/or the management system 402 can identify or recognize the objects located in the prediction queue 610 based on comparing the received sensor data with the master data 252 of FIG. 2.

The master controller 408 and/or the management system 402 can interact with the storage access system 404 for placing the container at one of the source locations 602 of FIG. 6A. For example, the master controller 408 and/or the management system 402 can identify the object needed at a down-stream station/task. The master controller 408 and/or the management system 402 can identify the container in the prediction queue 610 that includes the identified object. The master controller 408 and/or the management system 402 can further select the source location for receiving the identified container. The master controller 408 and/or the management system 402 can provide to the storage access system 404 the identified container, the location within the prediction queue 610 for the identified container, and/or the selected source location for the identified container. In response the storage access system 404 can control the corresponding AGV 422 to move the identified container to the selected source location. As described above, the storage access system 404 can adjust the flags to reflect whether the container placement is ongoing or finished.

At decision block 660, the one or more overseeing devices can determine whether the container is placed at the selected source location. For example, the master controller 408 and/or the management system 402 can monitor the control status of the storage access system 404 to determine whether the container is ready. The master controller 408 and/or the management system 402 can continue monitoring until the control status indicates that the containers have been placed at the selected source location.

When the containers are ready, as illustrated at block 662, the one or more overseeing devices can implement object removal. The master controller 408 and/or the management system 402 can derive the motion plan for picking up the targeted object from the source location 602 and place it at the destination location 604 as described above. In some embodiments, the master controller 408 and/or the management system 402 can derive or update the placement location and the corresponding motion plan in real-time.

As an illustrative example, the master controller 408 can receive one or more 2D/3D images representative of the container placed at the selected source location. The master controller 408 can process the received images, such as by determining height/depth values assigned to a grid system or a pixelated model of a placement surface in the container, to select an object and/or derive an approach location for approaching/gripping the object. In some embodiments, the master controller 408 may adjust the motion plan that resulted from the packing simulation according to the location of the identified/selected object in the container. In other embodiments, the master controller 408 may derive the object path and the corresponding motion plan according to the object location as described above. The master controller 408 can implement the motion plan by communicating the motion plan and/or the corresponding commands and/or settings to the removing unit 308. The removing unit 308 can execute the receive information to transfer an end-effector (e.g., gripper) to the object, grip the object with the end-effector, lift and laterally transfer the object, place the object and/or release the object according to the motion plan.

At block 664, the one or more overseeing devices can update the object placement status. For example, the master controller 408 and/or the management system 402 can maintain a placement flag that indicates whether a particular object has been placed at the destination location 604. Also, the master controller 408 and/or the management system 402 can maintain a placement execution flag that indicates whether the removing unit 308 is executing the motion plan to place an object at the destination location 604. After each placement, the master controller 408 and/or the management system 402 can determine other information regarding the placed object and/or the content of the source container, such as an identifier for the transferred object, an overall shape of the remaining set of objects in the container, and/or a quantity of remaining objects in the container.

At block 686, the storage access system 404 can update a container profile based on the placement status. The storage access system 404 can monitor the placement flag and/or the execution flag to identify that the object has been removed from the container. When the object has been placed at the destination location 604, the storage access system 404 can update the container profile of the corresponding container by removing details regarding the removed object. Also, the storage access system 404 can incrementally reduce the object quantity based on the monitored status(es).

At decision block 666, the robotic system 100 can determine whether operations/tasks associated with removal of the object(s) from the source location is complete. For example, the storage access system 404, the master controller 408, and/or the management system 402 can determine whether the container is empty after placement/removal of the object. Also, the master controller 408, and/or the management system 402 can determine whether the container is necessary or targeted for processing of subsequent objects.

When the container is not empty and/or targeted for subsequent processing, the master controller 408, and/or the management system 402 can continue picking subsequent objects from the containers at the source location 602. The master controller 408 and/or the management system 402 can continue with the next placement by repeating the above-described processes, such as from block 662. In some embodiments, the master controller 408, and/or the management system 402 can determine a desired removal count. The master controller 408 and/or the management system 402 can repeat the processes described above for block 662 and onward to remove the desired number of objects from the source location. The master controller 408 and/or the management system 402 can determine that operations/tasks associated with removal of the object(s) from the source location is complete when the desired number of objects have been transferred out of the container and to the destination location 604.

When the container is empty and/or does not correspond to the subsequently targeted objects, the master controller 408, and/or the management system 402 can direct the storage access system 404 to remove the container from the source location, such as by setting the MoveOut flag. In other words, the robotic system 100 can determine that no subsequently targeted objects are available at the source location 602. In response to such determination, the master controller 408, and/or the management system 402 can direct the storage access system 404 to remove the container from the source location, such as by setting the MoveOut flag. In response, as illustrated at block 688, the storage access system 404 can generate instructions to control and/or control the AGV 422 to remove the container from the source location. The storage access system 404 can generate instructions to control and/or control the AGV 422 to move to a different source location, a different station, a waiting area, or a storage area according to other operational factors or real-time conditions. After removing the container, thereby opening the source location, the control flow can pass to block 682 and/or 684 to bring a new container to the opened source location.

Figure 7A:
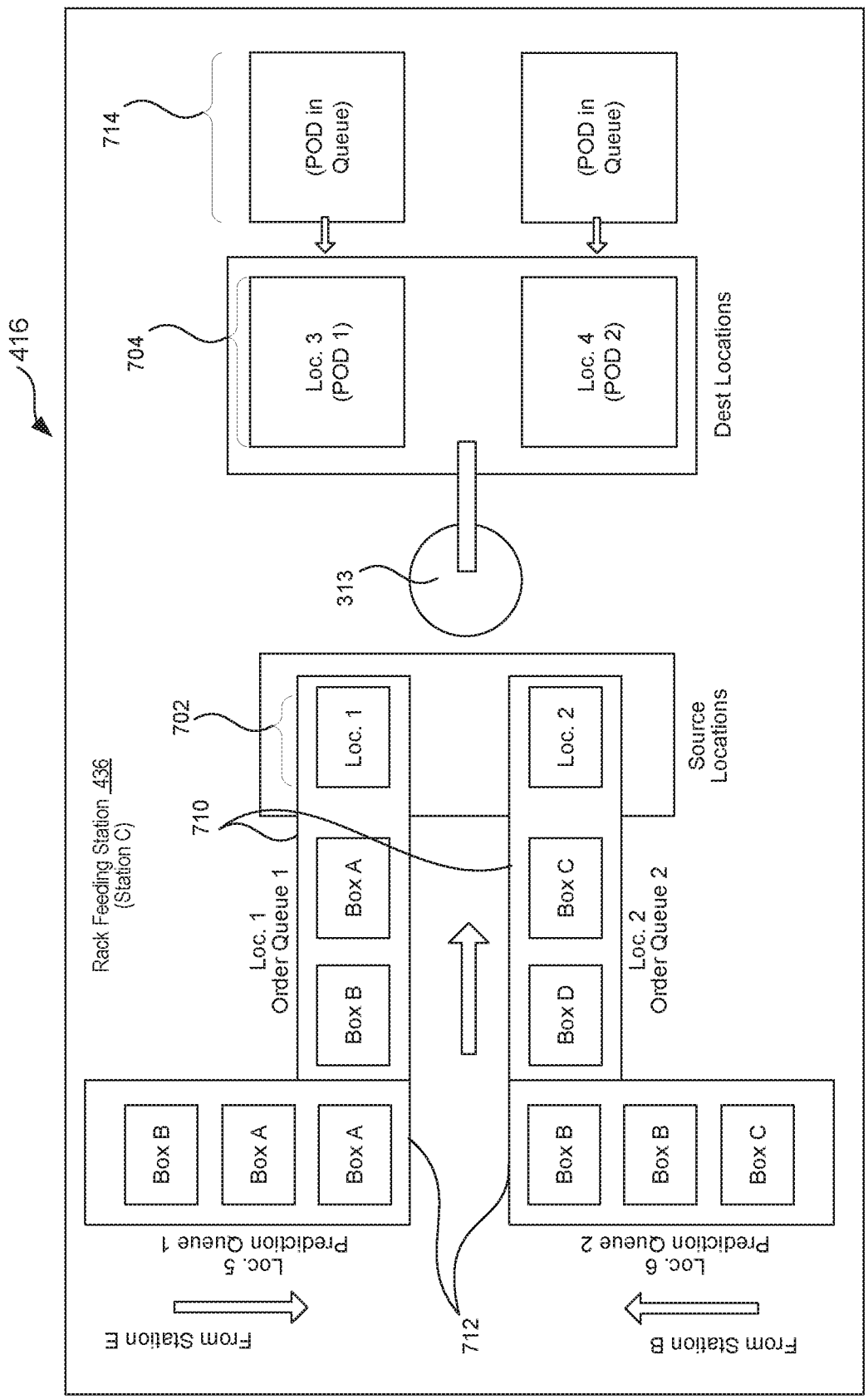
FIG. 7A is an illustration of a third example task station in accordance with one or more embodiments of the present technology.

FIG. 7A is an illustration of a third example production cycle (e.g., the third production cycle 416) in accordance with one or more embodiments of the present technology. Accordingly, FIG. 7A illustrates an example layout and/or functions of the rack feeding station 436. In some embodiments, the rack feeding station 436 can be configured to perform the group manipulation task 328 of FIG. 3 and/or the racking task 334 of FIG. 3. The rack feeding station 436 may include the shelving unit 313 (e.g., a rack shelving unit including a robotic arm with a corresponding end-effector). In some embodiments, the rack feeding station 436 can be configured to transfer objects to and place object on the storage racks.

The rack feeding station 436 can be similarly configured as the palletizing station 432 of FIG. 4 but for placing objects and/or contents therein to storage racks instead of placing objects in the containers. For example, the rack feeding station 436 can include a set of source locations 702 where the shelving unit 313 receives the objects (e.g., packages and/or boxes) targeted for transfer to/placement on the storage racks. For the example illustrated in FIG. 7A, the source locations 702 can correspond to end portions of ingress instances of the conveyors 424 of FIG. 4 (e.g., an instance of the object transport unit 305 of FIG. 3) nearest to the shelving unit 313. Also, the rack feeding station 436 can include one or more destination locations 704 configured to receive objects that are removed from the source objects. In some embodiments, the destination locations 704 can correspond to placement locations for racks and/or item containers (e.g., bins and/or objects) thereon. The source locations 702 and/or the destination locations 704 can be predetermined or spatially fixed relative to the shelving unit 313.

The rack feeding station 436 can include one or more order queues 710. The order queues 710 may precede the source locations 702. In some embodiments, the order queues 710 may include corresponding conveyors and/or other transport mechanisms that transfer the objects to the source locations 702. The order queues 710 may each be configured to hold a predetermined number of objects and/or include predetermined holding locations. Each of the order queues 710 may also include one or more cameras (e.g., 2D/3D imaging devices) configured to identify/recognize the objects placed in the order queues 710.

In some embodiments, each of the rack feeding station 436 may be operably coupled to a cross-station transport unit 712. The cross-station transport unit 712 (e.g., locomotive robotic units and/or conveyors) can be configured to transport objects across stations. For the example illustrated in FIG. 7A, the cross-station transport unit 712 may be configured to transport objects from the depalletizing station 434 of FIG. 4 (Station B) and/or the piece picking station 440 of FIG. 4 (Station E). In other words, the rack feeding station 436 may be configured to process objects that were depalletized at the depalletizing station 434 and/or objects that were filled with designated objects at the piece picking station 440. In some embodiments, the rack feeding station 436, via the cross-station transport unit 712, may be configured to receive and process opened objects from the package opening unit 310 of FIG. 3 and/or the corresponding station for the package opening task 332 of FIG. 3.

The rack feeding station 436 may further include one or more receiving queues 714 configured to temporarily hold receiving/storage racks ("POD" as illustrated in FIG. 7) before they are placed in the destination locations 704 to receive the objects. For example, the robotic system 100 can coordinate placement of a sequence of objects in the order queues 710. The robotic system 100 can control transport units (e.g., the AGVs 422 of FIG. 4) prepare/place a sequence of the storage racks in the receiving queues 714. The receiving queues 714 can correspond to the order queues 710. Accordingly, the robotic system 100 can increase the efficiency (via, e.g., decreasing time required to place/access the storage racks) in placing the incoming objects onto the storage racks.

As an illustrative example of the third production cycle 416 (e.g., the racking task 334), the management system 402 of FIG. 4 and/or the master controller 408 of FIG. 4 can identify/recognize the sequence of the incoming objects based on the sensor data from the order queues 710. The management system 402 and/or the master controller 408 can interact with the storage access system 404 of FIG. 4 for the available storage racks to place the incoming objects and compute the possible sequence of the storage racks to receive the incoming objects. In some embodiments, the management system 402 and/or the master controller 408 can communicate the sequence of the incoming objects and/or the corresponding racks to the storage access system 404. The storage access system 404 can prepare and control the transport units (e.g., the AGVs 422) to bring the racks to the receiving queues 714 and the destination locations 704. The management system 402 and/or the master controller 408 can track the progress/status of the storage access system 404 and coordinate timings (via, e.g., the MoveIn and/or MoveOut flags) for moving the AGVs 422 and the corresponding racks to/from the receiving queues 714 and the destination locations 704.

Figure 7B:
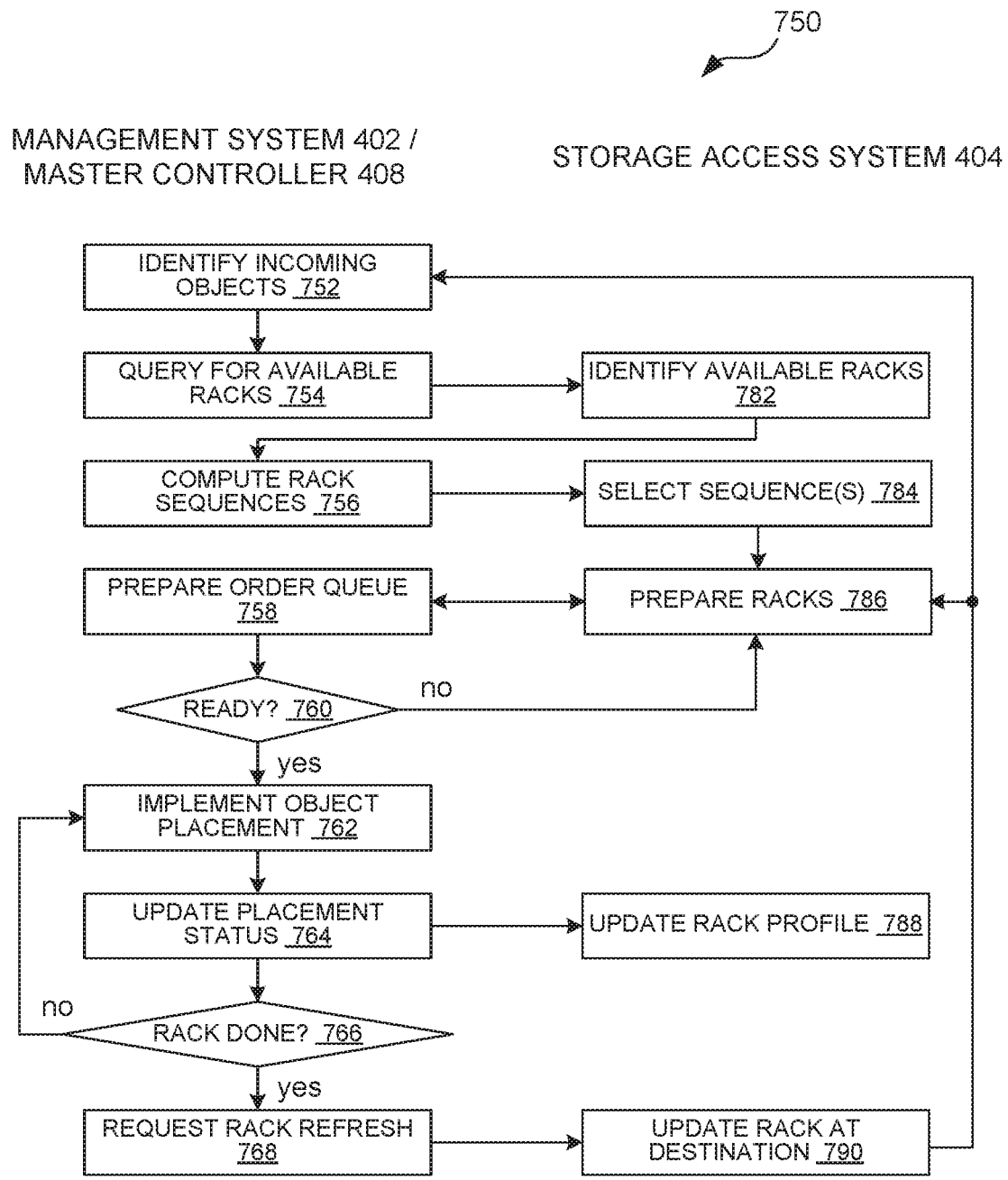
FIG. 7B is a flow diagram for a method of operating the robotic system of FIG. 1 in accordance with one or more embodiments of the present technology.

FIG. 7B is a flow diagram for a method 750 of operating the robotic system 100 of FIG. 1 in accordance with one or more embodiments of the present technology. The method 750 can be for implementing the third production cycle 416 of FIG. 4 (e.g., the group manipulation task 328 of FIG. 3 and/or the racking task 334). The method 750 can be implemented based on executing the instructions stored on one or more of the storage devices 204 of FIG. 2 with one or more of the processors 202 of FIG. 2. Accordingly, the one or more processors 202 may implement operations (by, e.g., generating/sending commands, settings, and/or plans) to control one or more units (e.g., the shelving unit 313 of FIG. 3, the group transport unit 307 of FIG. 3 such as the AGVs 422 of FIG. 4, the sensors 216 of FIG. 2, etc.) and/or components therein.

As an illustrative example, the processes illustrated on the left in FIG. 7B may be performed by one or more overseeing devices (e.g., the management system 402 and/or the master controller 408) that coordinate the operations/tasks for a grouping of systems, subsystems, and/or devices. The processes illustrated on the right in FIG. 7B may be performed by the storage access system 404. Accordingly, the method 750 can illustrate the interactions between the various devices/subsystems for the robotic system 100.

At block 752, the one or more overseeing devices can identify incoming objects. As an illustrative example, the master controller 408 and/or the management system 402 can identify the incoming objects (e.g., depalletized objects or bins resulting from picking tasks) associated with the racking task of a corresponding operation. The master controller 408 can receive sensor output data (e.g., 2D/3D images) from one or more sensors associated with the order queue 710 of FIG. 7A and/or sensor data from one or more sensors associated with the cross-station transport units 712 of FIG. 7A. The master controller 408 and/or the management system 402 can compare the sensor output data to the master data 252 of FIG. 2 that includes dimensions, surface images, identifier information, and/or other distinguishable physical attributes of known/registered objects. The master controller 408 and/or the management system 402 can identify or recognize the objects located in the order queue 710 accordingly. Also, as an illustrative example, the master controller 408 and/or the management system 402 can identify the incoming objects based on output status/information from other tasks and/or stations (e.g., the depalletizing station 434 of FIG. 4 and/or the piece picking station 440 of FIG. 4). Further, the master controller 408 and/or the management system 402 can identify the incoming objects based on incoming shipping manifests, packing/storage plans, and/or outgoing orders.

At block 754, the one or more overseeing devices can query for available racks. In some embodiments, for example, the master controller 408 and/or the management system 402 can communicate a predetermined command/message to the storage access system 404 for requesting a list of the available racks. The master controller 408 and/or the management system 402 may also communicate the identified incoming objects to the storage access system 404 along with and/or instead of the command.

At block 782, the management system 402 can identify available storage racks. In response to the command from the overseeing devices, the management system 402 can identify the storage racks that have open/available placement location(s) or slot(s) for receiving the incoming objects. For example, the management system 402 can identify the storage racks that have open/available locations assigned or predetermined to receive incoming objects. In some embodiments, the management system 402 can identify the available storage racks based on current statuses (e.g., filling percentages) of the storage racks. As an illustrative example, when multiple storage racks are assigned to receive incoming objects, the management system 402 can identify the available storage rack as the storage rack with the current status reflecting the lowest quantity of stored objects and/or corresponding items. The management system 402 can communicate the identified storage racks and/or other related information (e.g., the current statuses, the current locations, and/or the assigned storage locations of the racks) to the master controller 408 and/or the management system 402.

At block 756, the one or more overseeing devices can compute one or more rack sequences (e.g., a sequential combination of the identified racks or a subset thereof) based on the available storage racks. The master controller 408 and/or the management system 402 can obtain available rack information representative of the target storage containers (e.g., storage racks configured to store the bins or the objects having items therein) identified by the storage access system as candidates for receiving the incoming objects for storage. The master controller 408 and/or the management system 402 may compute a sequence of the available racks at the source location(s) 702 of FIG. 7A. For example, the master controller 408 may use a set of predetermined rules/processes to compute the sequence for placing the available racks at the source location(s) 702 and the receiving queues 714 of FIG. 7. The master controller 408 can compute the rack sequence based on a location and/or a relative sequence of the incoming objects and/or the available racks. The master controller 408 can compute the rack sequence based on reducing/minimizing one or more metrics or factors associated with placement of the objects.

As an illustrative example, the master controller 408 can compute the rack sequence by deriving different test rack sequences and a corresponding placement sequence of the incoming objects. For each test placement sequence, the master controller 408 may derive motion plans for placing the incoming objects accordingly. For each motion plan, the master controller 408 can calculate placement evaluation factors, such as an object travel distance/time, a number of maneuvers, a type or a number of input maneuvers, an estimated failure rate, a confidence measure, and/or other measures associated with placing the object at the source locations 702 and/or transferring the object from the source locations 702 to the destination locations 704. The master controller 408 may calculate rack sequence measures by combining one or more of the evaluation factors for the motion plans for each of the test placement sequences. The master controller 408 may finalize a set of the rack sequences based on the calculated sequence measures. For example, the master controller 408 can finalize the set of the rack sequences as a predetermined number of sequences with the highest sequence measures. Also, the master controller 408 can finalize the set of rack sequences as the sequences having the sequence measures above a predetermined sequence threshold. The one or more overseeing devices can communicate the finalized set of the rack sequences to the storage access system 404.

At block 784, the storage access system 404 can select one or more sequences based on the provided set of sequences. The storage access system 404 can evaluate the finalized set of the rack sequences according to predetermined rules and/or processes. For example, the storage access system 404 can evaluate the finalized set of the rack sequences based on calculating delays, maneuvers, travel distances, and/or other factors associated with accessing and transporting the racks according to the rack sequences. The storage access system 404 can select one or more of the sequences according to the evaluation of the finalized set of the rack sequences.

At block 786, the storage access system 404 can prepare the racks according to the selected sequence(s). The storage access system 404 may assign the rack transport unit 312 to the available racks in the selected sequence(s). For example, the storage access system 404 may assign the AGVs 422 to the racks identified in the selected sequence(s) according to distances between the AGVs 422 and the racks. The storage access system 404 can further determine locations, timings, sequences, and/or maneuvers for controlling the AGVs 422 to access the racks and transport them to the receiving queues 714 and the destination locations 704 according to the selected sequence(s). The storage access system 404 can control the AGVs 422 accordingly and place the racks in the receiving queues 714 and the destination locations 704 as identified by the selected sequence(s). The storage access system 404 can maintain one or more flags/status information associated with the preparation and communicate the one or more flags/status information with the one or more overseeing devices.

At block 758, the one or more overseeing devices can prepare order queues (e.g., the order queues 710) according to the selected sequence(s) and/or the preparation progress flags/status information. For example, the master controller 408 and/or the management system 402 can identify the sequence selected by the storage access system 404. The master controller 408 and/or the management system 402 may control the cross-station transport units 712, the order queues 710, and/or one or more robots at other preceding stations to prepare the order queues. The master controller 408 and/or the management system 402 can prepare the order queues by placing the incoming objects according to a sequence that matches the selected rack sequence(s). Also, the master controller 408 and/or the management system 402 can provide timing information and/or flags to coordinate placement of the racks. As an illustrative example, the master controller 408 can generate or set the MoveIn flags that the storage access system 404 can use to control the AGVs 422 and place the racks in the receiving queues 714 and/or the destination locations 704.

Returning to block 786, the storage access system 404 can use the information from the one or more overseeing devices to control the rack transport units 312. For example, the storage access system 404 can use the MoveIn flag as a trigger to control the corresponding AGV 422 and move the rack from the receiving queue 714 to the destination location 704. As described above, the storage access system 404 can update and/or maintain the status information regarding the rack placement.

At decision block 760, the one or more overseeing devices can determine whether the storage rack is ready for receiving the object. For example, the master controller 408 and/or the management system 402 can monitor the control status of the storage access system 404 to determine whether the storage rack is ready. The master controller 408 and/or the management system 402 can continue monitoring until the control status indicates that the storage racks have been placed at the designated destination locations 704.

When the storage racks are ready, as illustrated at block 762, the one or more overseeing devices can implement object transfer. The master controller 408 and/or the management system 402 can derive the motion plans as described above for picking up the objects from the source locations 702 and placing them at the destination locations 704. In some embodiments, the master controller 408 and/or the management system 402 may derive or update the placement location and the corresponding motion plans based on real-time condition of the racks at the destination locations 704.

The master controller 408 can implement the motion plan by communicating the motion plan and/or the corresponding commands and/or settings to the shelving unit 313. The shelving unit 313 can execute the receive information to transfer an end-effector (e.g., gripper) to the object, grip the object with the end-effector, lift and laterally transfer the object, place the object and/or release the object according to the motion plan. Accordingly, the master controller 408 can control the shelving unit 313 to place the object on the storage rack.

At block 764, the one or more overseeing devices can update the object placement status. For example, the master controller 408 and/or the management system 402 can maintain a placement flag that indicates whether a particular object has been placed on the storage rack. Also, the master controller 408 and/or the management system 402 can maintain a placement execution flag that indicates whether the grouping unit 306 is executing the motion plan to place an object in the storage rack. After each placement, the master controller 408 and/or the management system 402 can determine other information regarding the placed object and/or the content of the storage rack, such as an identifier for the newly placed object, a placement location of the newly placed object, and/or a quantity of objects on the storage rack.

At block 788, the storage access system 404 can update a rack profile based on the placement status. The storage access system 404 can monitor the placement flag and/or the execution flag to identify that the object has been placed on the storage rack. When the object has been placed in the storage rack, the storage access system 404 can update the rack profile that includes details regarding the contents of the corresponding storage rack. For example, the storage access system 404 can receive and store the content information from the master controller 408 and/or the management system 402 into the rack profile. Also, the storage access system 404 can incrementally increase the object quantity based on the monitored status(es).

At decision block 766, the robotic system 100 can determine whether sub-tasks associated with the storage rack at the destination location is complete For example, the storage access system 404, the master controller 408, and/or the management system 402 can determine whether the storage rack is full after placement of the object, such as by comparing the updated object quantity to the predetermined limit for the rack. Also, the master controller 408 and/or the management system 402 can determine whether the storage rack is necessary or targeted for placement of subsequent incoming objects. When the storage rack is not full and/or targeted for subsequent placements, the master controller 408 and/or the management system 402 can continue placing the subsequently incoming objects (e.g., the next object in the order queue 710). The master controller 408 and/or the management system 402 can continue with the next placement by repeating the above-described processes, such as from block 762.

When the container is full and/or does not correspond to the incoming objects, as illustrated at block 768, the master controller 408 and/or the management system 402 can direct the storage access system 404 to remove the storage rack from the destination location, such as by setting the MoveOut flag. In other words, the robotic system 100 can determine that no subsequently incoming objects will likely be placed on the storage rack. In response to such determination, the master controller 408 and/or the management system 402 can direct the storage access system 404 to remove the storage rack from the destination location, such as by setting the MoveOut flag. In response, as illustrated at block 790, the storage access system 404 can control the AGV 422 to remove the container from the destination location. The storage access system 404 can control the AGV 422 to move to a different destination location, a different station, a waiting area, or a storage area according to other operational factors or real-time conditions.

In some situations, such as when the rack sequence has not been complete, the control flow may proceed to block 786. Accordingly, the storage access system 404 may identify the next racks to be placed at the destination locations 704 and/or in the receiving queues 714. The method 750 can proceed as described above to place the remaining objects in the updated container. In some other situations, the control flow can proceed to block 752 and repeat the above-described processes to place the subsequently incoming objects in the corresponding storage racks.

Figure 8A:
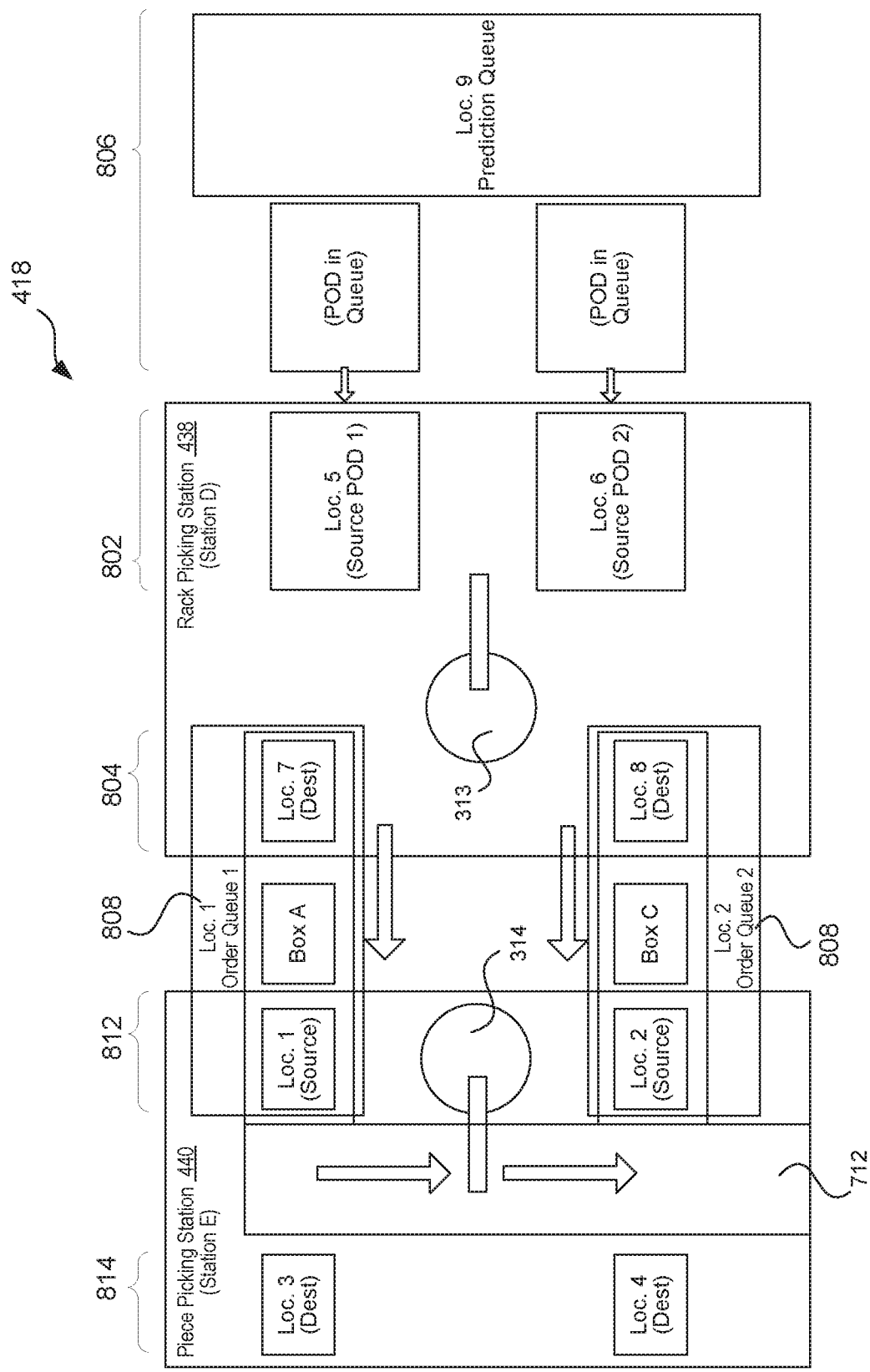
FIG. 8A is an illustration of a fourth example task station in accordance with one or more embodiments of the present technology.

FIG. 8A is an illustration of a fourth example production cycle (e.g., the fourth production cycle 418) in accordance with one or more embodiments of the present technology. Accordingly, FIG. 8A illustrates an example layout and/or functions of the rack picking station 438 and/or the piece picking station 440. As an illustrative example, the fourth production cycle 418 can be for accessing items that may be contained and stored in multiple different bins (e.g., storage boxes or packages)/storage racks and for grouping the accessed items into a single bin. Once the items have been accessed or picked, the corresponding bins may be transferred to a different station (e.g., the rack feeding station 436) where the bins may be placed back on storage racks. The bin including the grouped items can also be transferred to a different station for outgoing shipments (e.g., the packing task 344 of FIG. 3 and/or the outbound grouping task 346 of FIG. 3) and/or for storage (e.g., the racking task 334 of FIG. 3).

The rack picking station 438 can be configured to perform the group manipulation task 328 of FIG. 3 and/or the racking task 334 of FIG. 3. In other words, the rack picking station 438 may be configured to remove objects or bins from the storage racks. The rack picking station 438 can be similarly configured as the depalletizing station 434 of FIG. 4 but for removing bins from storage racks instead of other containers (e.g., pallets).

The rack picking station 438 may include the shelving unit 313 (e.g., a rack shelving unit including a robotic arm with a corresponding end-effector). The shelving unit 313 can access bins from one or more bin source locations 802 and move them to one or more bin destination locations 804. For the example illustrated in FIG. 8A, the bin source locations 802 can include placement locations for the targeted bin and/or the storage rack having the targeted bin thereon. The bin destination locations 804 can correspond to end portions of cross-station transport units 808 (e.g., an instance of the object transport unit 305 of FIG. 3) nearest to the shelving unit 313. For example, the bin destination locations 804 can include end portions of egressing instances of the conveyors 424 of FIG. 4 configured to carry bins from the rack picking station 438 to another station. The bin source locations 802 and/or the bin destination locations 804 can be predetermined or spatially fixed relative to the shelving unit 313.

The rack picking station 438 may include one or more rack queues 806. The rack queues 806 may include holding areas for the racks, and the rack queues 806 may be located before the bin source locations 802. For example, the rack queues 806 can include temporary rack storage areas located between the bin source locations 802 and the rack storage area. In some embodiments, the rack queues 806 can include one or more sensors (e.g., the imaging sensors, such as 2D/3D cameras, and/or scanners) configured to identify the rack and/or the bins on the racks. The robotic system 100 can use the rack queues 806 to sequence the racks and/or buffer the rack storage to improve efficiencies for the group manipulation task 328, such as by reducing access times associated with the shelving unit 313 accessing the targeted bins.

The piece picking station 440 can be configured to perform the picking task 342 of FIG. 3 by picking/removing items from within the bins and transferring the picked items to destination locations or destination bins. The piece picking station 440 can be similarly configured as the palletizing station 432 of FIG. 4 but for removing and transferring items contained within objects/bins instead of transferring the objects/bins themselves.

The piece picking station 440 may include the picking unit 314 (e.g., a piece-picking unit including a robotic arm with a corresponding end-effector) for performing the picking task 342. The picking unit 314 can access targeted items from bins that are placed at one or more item source locations 812 and move them to output bins located at one or more item destination locations 814. For the example illustrated in FIG. 8A, the item source locations 812 can include end portions of the cross-station transport units 808 opposite the bin destination locations 804. In other words, the cross-station transport units 808 can transport the bins accessed by the shelving unit 313 to the piece picking station 440, and the picking unit 314 can pick the items from the bins that are on the cross-station transport units 808. The destination locations 814 can be locations for item-receiving bins designated to receive the picked items. Some examples of the destination locations 814 can include designated locations on the floor and/or designated locations on other instances of the object transport unit 305. The item source locations 812 and/or the item destination locations 814 can be predetermined or spatially fixed relative to the picking unit 314.

The piece picking station 440 may include other instances of the object transport unit 305 configured to transport the accessed bins to other stations for subsequent processing. As an illustrative example, the piece picking station 440 can include the cross-station transport units 712 configured to transport the bins to the rack feeding station 436 of FIG. 4. Once the picking unit 314 completes the picking task 342 for the bin, the cross-station transport units 712 can transport the bin to the rack feeding station 436. The transported bin can be placed on a storage rack at the rack feeding station 436 as described above.

Similarly, the item-receiving bins can be transported via other instances of the object transport unit 305 to other stations for subsequent processing. For example, the item-receiving bins can be transported from the item destination locations 814 to the rack feeding station 436 for placement on storage racks, such as for concluding the stocking operation 330 of FIG. 3 (e.g., to reorganize or redistribute the items). Also, the item-receiving bins can be transported for packing task 344 of FIG. 3 and/or outbound grouping task 346 of FIG. 3, such as for concluding the shipping operation 340 of FIG. 3.

In some embodiments, as illustrated in FIG. 8A, one control device (e.g., one instance of the master controller 408) may control both the shelving unit 313 and the picking unit 314 (e.g., two robotic arms) and the corresponding transport units for the fourth production cycle 418. The storage access system 404 may have access (via, e.g., the management system 402) to picking objectives (e.g., outgoing orders) targeted for the picking unit 314. In some embodiments, the storage access system 404 and/or the master controller 408 may produce a production queue (via, e.g., the rack queues 806) and/or an order queue (via, e.g., the picking queues 816). Based on the order queue, the master controller 408 can derive schedules/sequences for the racks and share the results with the storage access system 404. The storage access system 404 can select and/or finalize the rack schedule/sequence and control placement of the racks at the rack queues 806 and/or the bin source locations 802 accordingly. The master controller 408 may provide triggers (e.g., MoveIn and/or MoveOut) to the storage access system 404 for controlling the placement of the racks. The master controller 408 can control the shelving unit 313 based on the placement of the racks, and then control the picking unit 314 based on the tasks performed by the shelving unit 313 and/or the cross-station transport units 808. The master controller 408 can update the storage access system 404 with the number of items removed from the accessed bin. Accordingly, the storage access system 404 can update profile/content information for the accessed bin.

Figure 8B:
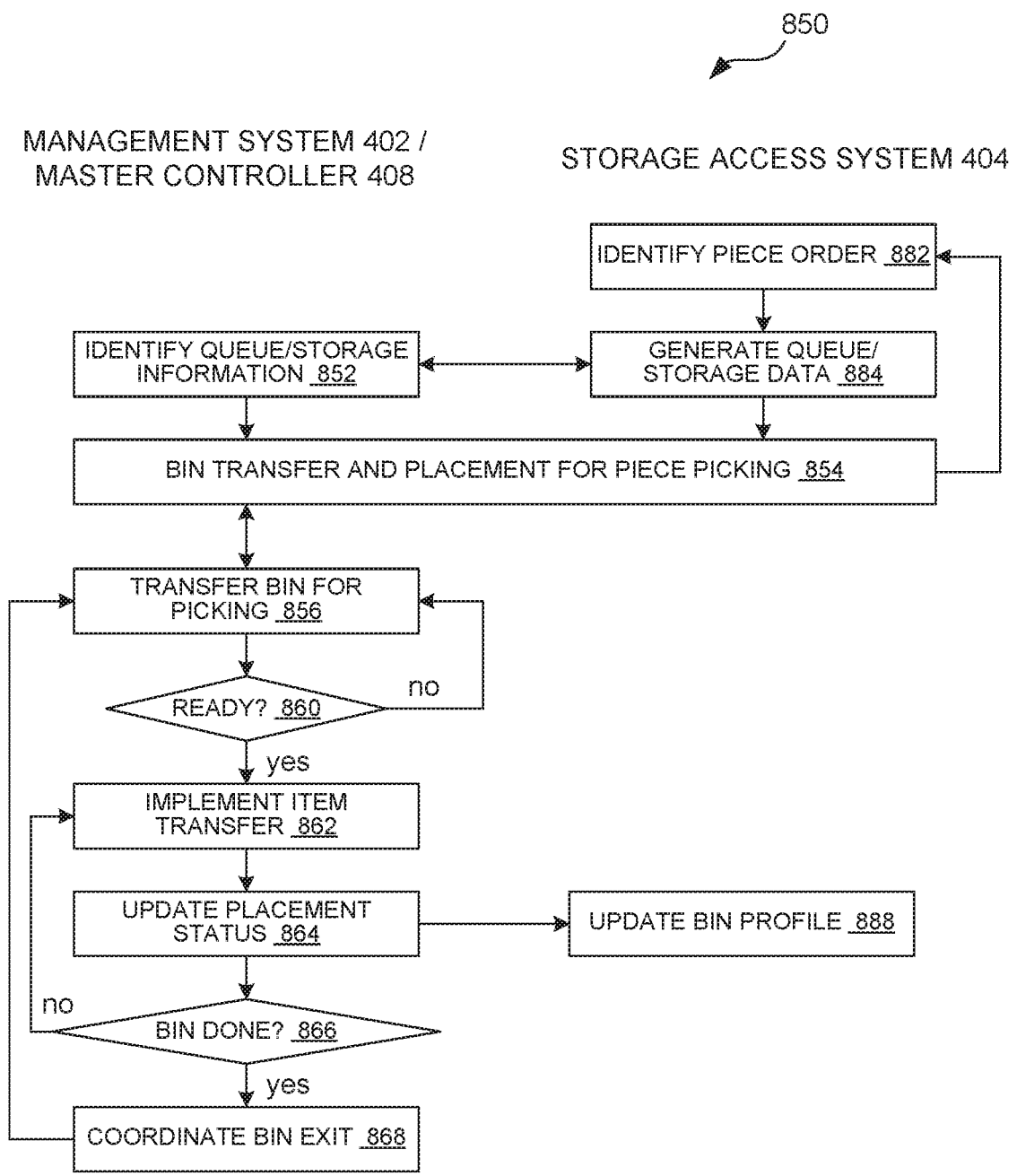
FIG. 8B is a flow diagram for a method of operating the robotic system of FIG. 1 in accordance with one or more embodiments of the present technology.

FIG. 8B is a flow diagram for a method 850 of operating the robotic system of FIG. 1 in accordance with one or more embodiments of the present technology. The method 850 can be for implementing the fourth production cycle 418 of FIG. 4 (e.g., the picking task 342 of FIG. 3 and/or the group manipulation task 328 of FIG. 3). The method 850 can be implemented based on executing the instructions stored on one or more of the storage devices 204 of FIG. 2 with one or more of the processors 202 of FIG. 2. Accordingly, the one or more processors 202 may implement operations (by, e.g., generating/sending commands, settings, and/or plans) to control one or more units (e.g., the shelving unit 313 of FIG. 3, the picking unit 314 of FIG. 3, transport units, the sensors 216 of FIG. 2, etc.) and/or components therein.

As an illustrative example, the processes illustrated on the left in FIG. 8B may be performed by one or more overseeing devices (e.g., the management system 402 and/or the master controller 408) that coordinate the operations/tasks for a grouping of systems, subsystems, and/or devices. The processes illustrated on the right in FIG. 8B may be performed by the storage access system 404. Accordingly, the method 850 can illustrate the interactions between the various devices/subsystems for the robotic system 100.

At block 882, the storage access system 404 can identify piece orders intended for fulfillment by the fourth production cycle 418. For example, the storage access system 404 can receive an outgoing/customer order, a reorganization plan, or another item grouping plan from the management system 402. The storage access system 404 can identify details regarding the received orders, such as item identifiers, item types or categories, item quantities, grouped items, and/or grouping sequences for each container and/or a sequence of containers.

At block 884, the storage access system 404 can generate queue and/or storage data associated with the identified items. For example, the storage access system 404 can identify storage locations and/or current locations of bins having the identified items therein. In identifying the locations, the storage access system 404 can use the identified details to search maintained profiles for bins/containers/objects/racks and the contents therein. The storage access system 404 can identify the corresponding storage units that include the identified items and their tracked and/or designated locations.

In some embodiments, the storage access system 404 can communicate the identified storage units to the one or more overseeing devices. The one or more overseeing devices may use the identified storage units and/or their locations to generate sequences for queues (e.g., the rack queues 806 of FIG. 8A and/or the picking queues 816 of FIG. 8A). In other embodiments, the storage access system 404 can generate the queue sequences and communicate the generated information to the one or more overseeing devices. The robotic system 100 can generate the queue sequences each including an ordered combination of the storage units and/or corresponding placement timings.

The robotic system 100 may generate one or more queue sequences for the rack queues 806 as the ordered combination of the racks having bins thereon that include the targeted items. The robotic system 100 may further generate one or more queue sequences for the picking queues based on the queue sequences for the rack queues 806.

As an illustrative example, the robotic system 100 can generate the queue sequences based on the current/storage locations for the corresponding storage units and according to predetermined rules/processes. The robotic system 100 can derive test sequences for placing the storage units at the rack queues 806 and/or the bin destination locations 804. Based on the test sequences, the robotic system 100 can derive associated sequences for the picking queues 816 as an ordered combination of the bins transferred from the placed storage racks. The robotic system 100 can further derive the corresponding robotic unit actions, robotic unit maneuvers, travel paths, travel times, and/or other costs associated with placing the storage units according to the test sequences and/or placing the bins according to the associated sequences. The robotic system 100 can select/finalize a set of the test sequences as the queue sequences according to the derived costs. For example, the finalized queue sequences can be a predetermined number of the test sequences having the lowest costs and/or the test sequences having costs below a predetermined placement threshold.

At block 852, the one or more overseeing devices can identify the queue sequence and/or storage information. As described above, the master controller 408 and/or the management system 402 can generate the information or receive the information from the storage access system 404. The queue sequence can include rack queue information representative of a sequence of storage racks having bins thereon that include ordered items. The queue sequence can also include picking queue information representative of a sequence of the bins.

The master controller 408, the management system 402, and/or the storage access system 404 can interact with each other to implement the rack and/or placement according to the queue sequence. At block 854, the master controller 408, the management system 402, and/or the storage access system 404 can transfer and place the bin for piece picking. The master controller 408, the management system 402, and/or the storage access system 404 can transfer and place the bin (e.g., a de-racking task) based on one or more processes similar to processes described above for the method 650 of FIG. 6B. For example, the storage access system 404 can place the targeted racks in the rack queues 806 and/or the bin source locations 802 according to timing control provided by the master controller 408 and/or the management system 402. Based on the placement status of the racks, the master controller 408 and/or the management system 402 can control (via, e.g., derived motion plans) the shelving unit 313 to transfer the targeted bins from the racks at the bin source locations 802 to the bin destination locations 804. For example, the master controller 408 may operate the shelving unit 313 to remove the target bin from the storage rack and place the bin on the destination location according to the picking queue information.

At block 856, the one or more overseeing devices can coordinate bin transfer for picking tasks. For example, the master controller 408 and/or the management system 402 can track movements of the shelving unit 313 to determine when the bins are placed at the bin destination locations 804, such as the cross-station transport units 808. Accordingly, the master controller 408 and/or the management system 402 can control the cross-station transport units 808 to move the placed bins from the rack picking station 438 (e.g., the bin destination locations 804 therein) to the piece picking station 440 (e.g., the item source locations 812 therein).

At decision block 860, the one or more overseeing devices can determine whether the bin is ready for the piece picking task. For example, the master controller 408 and/or the management system 402 can track the movements of the cross-station transport units 808 and/or the bins thereon. The master controller 408 and/or the management system 402 can continue transferring the target bins to the piece picking station 440 and/or the item source locations 812 therein.

When the targeted bins are ready, such as illustrated at block 862, the one or more overseeing devices can implement item transfers. For example, the master controller 408 and/or the management system 402 can implement a transport plan for operating the object transport unit 305 to transport the placed bin from the rack picking station 438 to the item source location of the piece picking station 440. The master controller 408 and/or the management system 402 may obtain, via 2D/3D sensors at the item source locations 812, current conditions (e.g., item poses) within the bins at the item source locations 812. The master controller 408 and/or the management system 402 can recognize the items based on the sensor data and derive motion plans and/or the travel paths for transferring the items from the bin at the item source locations 812 to the bins at the item destination locations 814. The motion plans can correspond to commands, settings, and/or sequences thereof for gripping the items, lifting and laterally transferring the items, and/or lowering and placing the items at the item destination locations 814. The master controller 408 and/or the management system 402 can use the motion plans to control the picking unit 314 to transfer the items.

At block 864, the one or more overseeing devices can update the placement status based on tracking the progress of the motion plan. For example, the master controller 408 and/or the management system 402 can interact with the picking unit 314 to track the progress of the motion plan. The master controller 408 and/or the management system 402 can update the placement status when the item is placed in the bin at the corresponding item destination location 814. The master controller 408 and/or the management system 402 can further interact with the storage access system 404 according to the placement status. At block 888, the storage access system 404 can update profiles for the bins at the item source locations 812 and/or the bins at the item destination locations 814. For example, the storage access system 404 can update the profiles by reducing the item count and/or updating the item locations for the bins at the item source locations 812. Also, the storage access system 404 can update the profiles by increasing the item count and/or updating the item locations for the bins at the item destination locations 814.

At decision block 866, the one or more overseeing devices can determine whether operations/tasks associated with the bins at the item source locations 812 is complete. In other words, the master controller 408 and/or the management system 402 can determine whether all planned items have been removed from the sourcing bin. In some embodiments, the master controller 408 can determine a number of items designated to be picked from each incoming bin. The master controller 408 can track the placement status to determine the number of items removed from the bin at the item source locations 812. When the number of removed items is less than the targeted number of items, the master controller 408 can continue to implement the item transfer as illustrated by the feedback loop to block 862.

When the targeted tasks for the bin is complete, such as illustrated at block 868, the one or more overseeing devices can coordinate removal of the bins from the item source locations 812. For example, the master controller 408 and/or the management system 402 can control the object transport units 305 of FIG. 3 (e.g., the cross-station transport units 712 of FIG. 7A and/or the cross-station transport units 808) to remove the bins and/or transfer the bins to the next station (e.g., the rack feeding station 436 of FIG. 7A to return the bin to the storage rack and/or the storage location).

Once the bin has been removed and/or along with removal of the bin, the one or more overseeing devices can transfer the subsequent bin for the next picking task. As illustrated by the feedback loop to block 856, the master controller 408 and/or the management system 402 can transfer the subsequent bin for picking along with coordinating the removal of the finished bin. For example, the master controller 408 and/or the management system 402 can operate the cross-station transport units 808 to transfer the subsequent bin to the item source locations 812 while removing the existing bin. The master controller 408 and/or the management system 402 can use the status of the placements/removals to operate the shelving unit 313 and/or the corresponding tasks. The master controller 408 and/or the management system 402 can further communicate the status of the bins with the storage access system 404. Accordingly, the storage access system 404 can coordinate rack removals/placements with respect to the rack queues 806 and/or the bin destination locations 804. When the last bin in the queues for the piece order has been transferred from the rack, the flow can return to block 882 to process subsequent orders.

Example Transitions Between Tasks

Figure 9A:
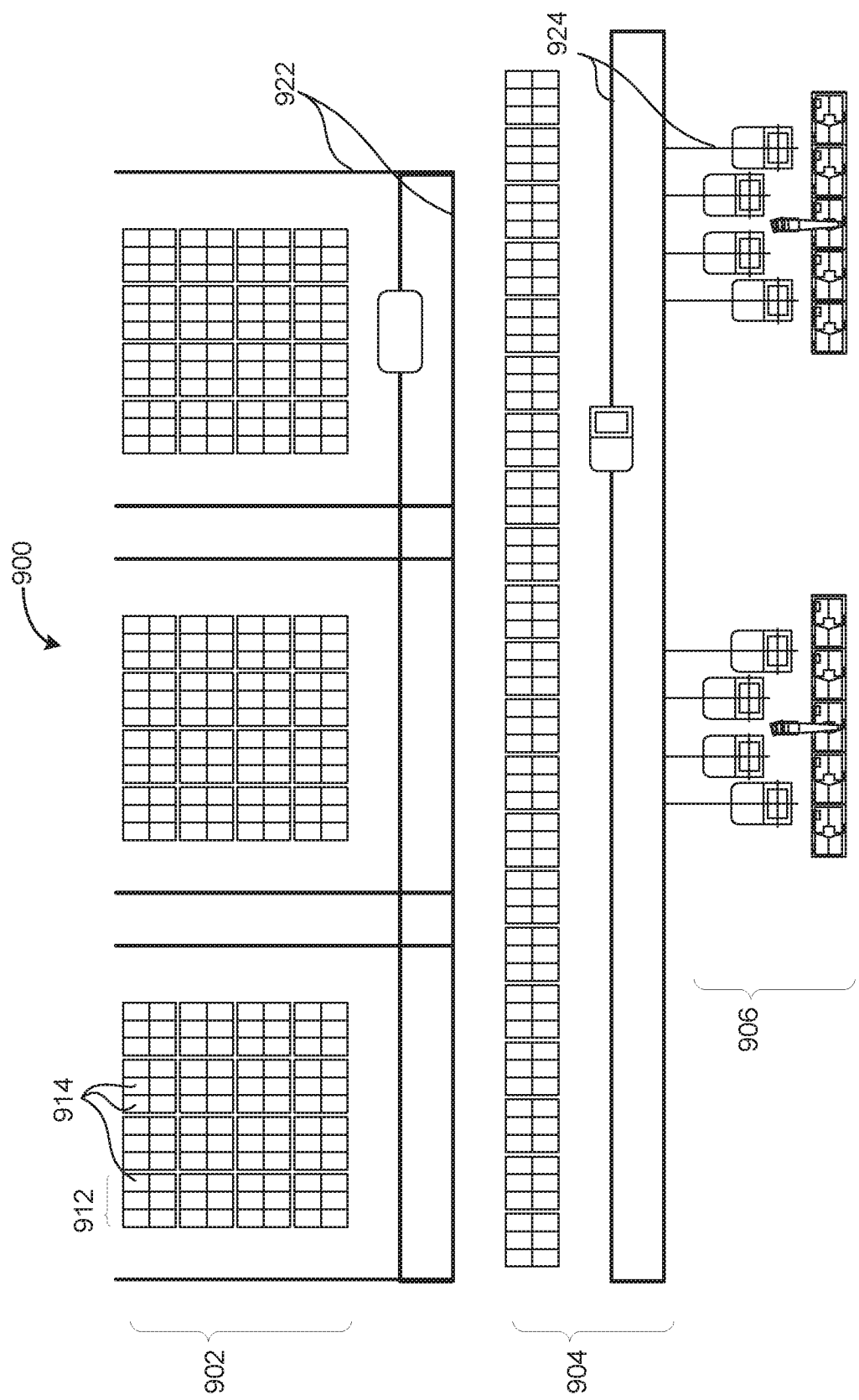
FIGS. 9A and 9B are illustrations of example task transitions in accordance with one or more embodiments of the present technology.
Figure 9B:
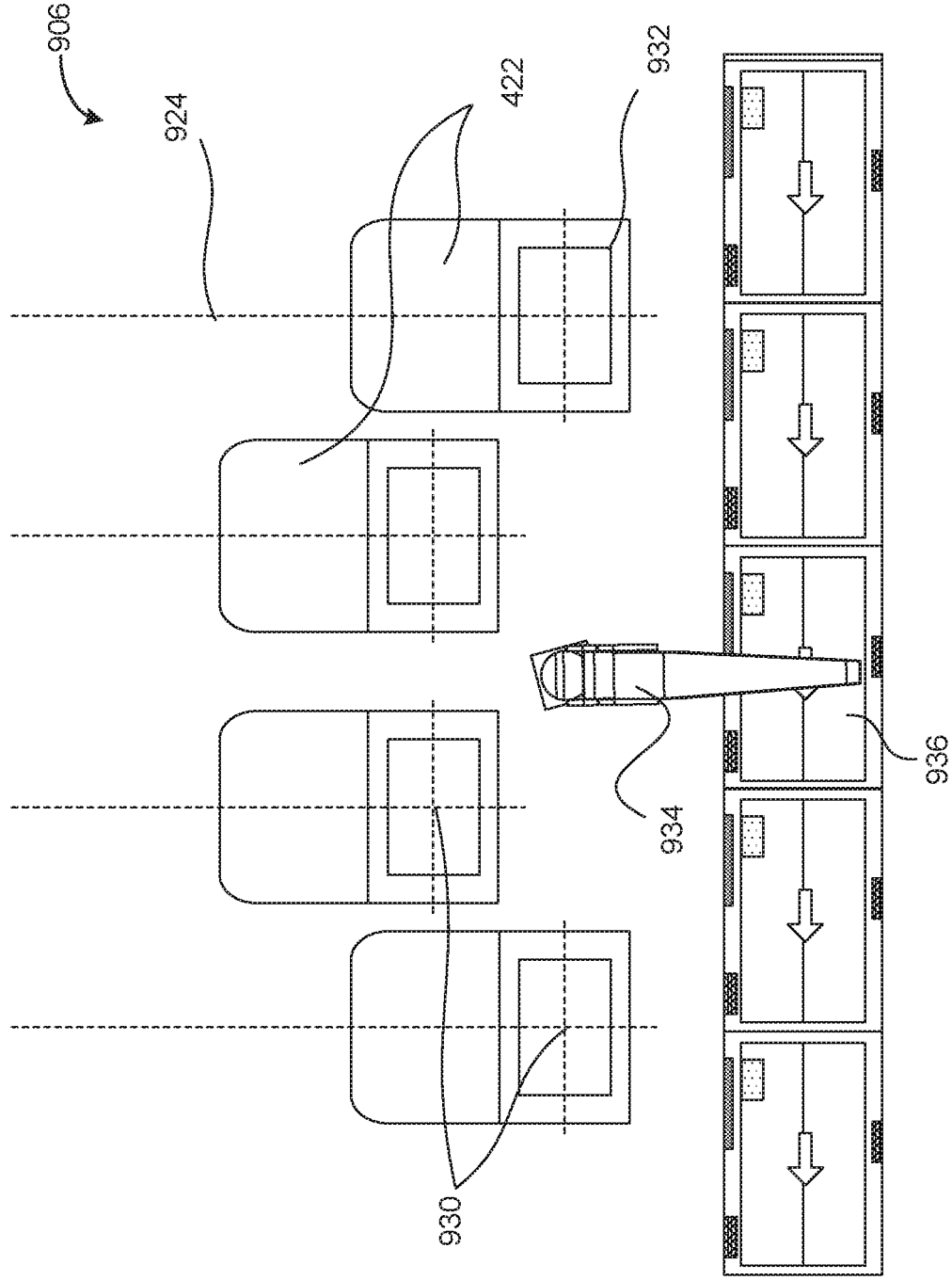

FIGS. 9A and 9B are illustrations of example task transitions in accordance with one or more embodiments of the present technology. FIG. 9A illustrates an example layout 900 for the environment in which the robotic system 100 of FIG. 1 may operate. The environment may include one or more storage areas 902, one or more transition queues 904, and/or one or more task stations 906. Each storage area 902 can be configured to store targeted objects/items. In some embodiments, the storage area 902 can be configured to store group storage units 912 (e.g., storage racks and/or pallets) that hold multiple individual storage units 914 (e.g., the objects, such as packages, boxes, bins, and/or other containers) and/or items therein. For example, the robotic system 100 can control/implement the receiving operation 320 of FIG. 3 and/or the stocking operation 330 of FIG. 3 to place the targeted objects/items at the storage area 902.

The transition queues 904 can include temporary holding areas configured to provide access to targeted racks, objects/bins, and/or items according to a determined sequence. The transition queues 904 can be used as access buffer between the storage area 902 and the task stations 906. Some examples of the transition queues 904 can include picking queues 816 of FIG. 8A, the rack queues 806 of FIG. 8A, the order queues 710 of FIG. 7A, and/or other queues described above. Each of the task stations 906 can include an area configured to perform a task, a sub-task, an operation, or a combination thereof. Some examples of the task stations 906 can include the palletizing station 432 of FIG. 4, the depalletizing station 434 of FIG. 4, the rack feeding station 436 of FIG. 4, the rack picking station 438 of FIG. 4, the piece picking station 440 of FIG. 4, the destination station 442 of FIG. 4, and/or other stations for tasks/operations described above.

As illustrated in FIG. 9A, the task stations 906 and/or the transition queues 904 can correspond to the rack picking station 438, the piece picking station 440, and/or the rack feeding station 436. The task stations 906 and/or the transition queues 904 can correspond to an alternative embodiment of the rack picking station 438 and/or the piece picking station 440. For example, the robotic system 100 can control different types of AGVs to transport the racks between the storage area 902 and the transition queues 904, and transport objects between the racks at the transition queues 904 and the task stations 906. The AGVs can follow storage access paths 922 between the storage area 902 and the transition queues 904, and/or follow task access paths 924 between the transition queues 904 and the task stations 906. The robotic system 100 (e.g., the AGVs 422 and/or the storage access system 404) can determine or access predetermined locations of the access paths 922 and/or the access paths 924.

FIG. 9B illustrates an example of the task stations 906. The illustrated example can be an alternative embodiment of the piece picking station 440, the rack feeding station 436, and/or a portion thereof. The task station 906 can include a transfer unit 934, such as the grouping unit 306 of FIG. 3, the picking unit 314 of FIG. 3, the removing unit 308, and/or other robotic units described above configured to perform the corresponding tasks.

The task stations 906 can include one or more access locations 930 that represent predetermined stopping locations for the AGVs 422. For example, the access locations 930 can be the end locations of the task access paths 924. Accordingly, by placing the AGVs 422 at the access locations 930, the robotic system 100 can place target containers 932 (e.g., pallets and/or bins) at predetermined task locations (e.g., source/destination locations described above). The robotic system 100 can operate the transfer unit 934 to access or place the target containers 932 to/from the access locations 930. The transfer unit 934 can perform the tasks according to corresponding task locations 936.

As an illustrative example of the picking task 342, the AGVs 422 can bring the targeted bin to the access locations 930. The picking unit 314 of FIG. 3 (e.g., an instance of the transfer unit 934) can pick items from the targeted bin and transfer them to the corresponding task locations 936 (e.g., the target bin at the item destination locations 814 of FIG. 8A). As an illustrative example of the storage grouping task 326 of FIG. 3, the corresponding task locations 936 can be the object pick up location (e.g., the source location 502 of FIG. 5A) and the access locations 930 can be the object placement location (e.g., the destination locations 504 of FIG. 5A). Alternatively, the corresponding task locations 936 can be the object placement location (e.g., the destination location 604 of FIG. 6A) and the access locations 930 can be the object pick up location (e.g., the source location 602 of FIG. 6A) for a portion of the depalletizing task.

Figure 9C:
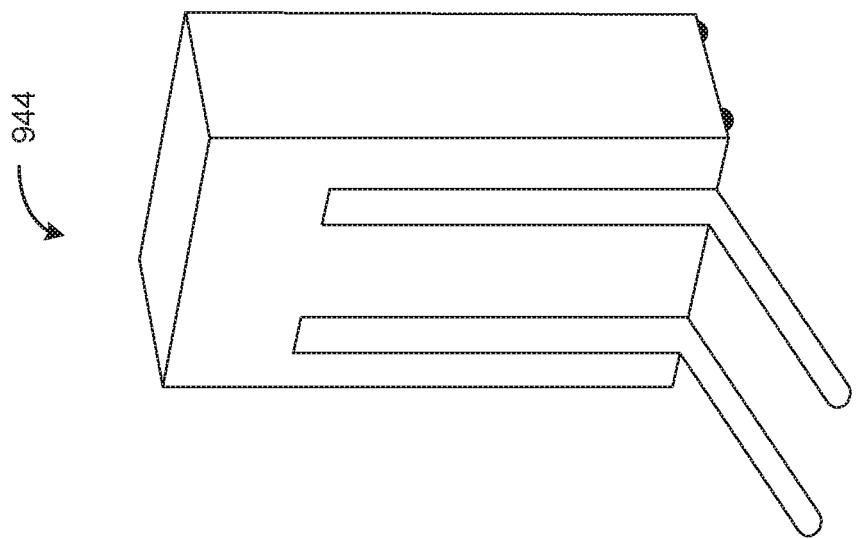
FIG. 9C is an illustration of example transport units in accordance with one or more embodiments of the present technology.
Figure 9C:
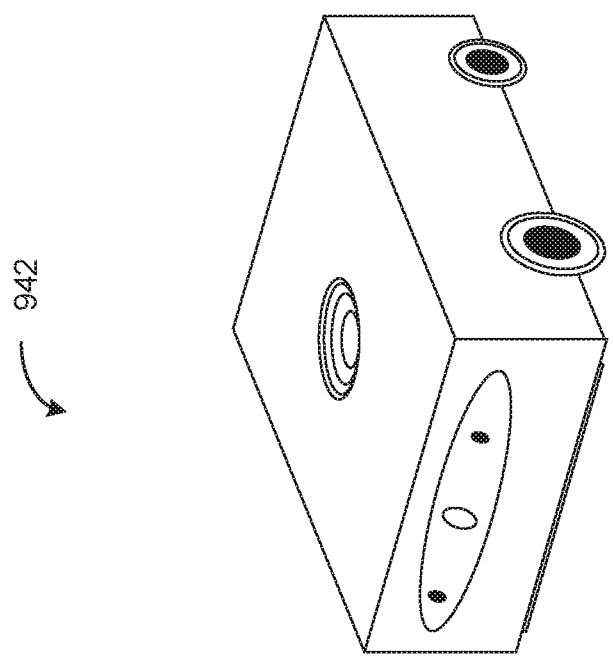

FIG. 9C is an illustration of example transport units in accordance with one or more embodiments of the present technology. In some embodiments, the AGVs 422 of FIG. 4 can include a rack transport unit 942 and/or a shelf access unit 944. The rack transport unit 942 can be configured to transport the storage racks between designated locations, such as between the storage area 902 of FIG. 9A and the transition queue 904 of FIG. 9A. In one or more embodiments, the rack transport unit 942 can include a locomotive robot configured to contact and lift the targeted racks for transport.

The shelf access unit 944 can be configured to transport objects or bins to/from racks and other corresponding locations. The shelf access unit 944 may include access mechanisms, such as arms and/or fork lifts configured to place and/or remove objects/bins from shelves. For example, the access mechanism for the shelf access unit 944 can include a height adjustable platform with extendable arms attached thereto. The height adjustable platform can be raised or lowered along vertically-oriented rails of the shelf access unit 944 to a corresponding height of a rack shelf that includes the target object (e.g., bin/container). Once the height adjustable platform is at the corresponding height, the extendable arms can be extended and securing flaps attached at distal ends of the extendable arms can be engaged (e.g., folded or rotated) to secure the back of the target object (e.g., the side of the bin/container facing away from the shelf access unit 944). The extendable arms and the securing flaps may engage and load the target object onto the height adjustable platform when the extendable arms are retracted towards the shelf access unit 944. In some embodiments, the shelf access unit 944 can transport the objects or bins to/from racks in the storage area 902 and/or the transition queue 904. The shelf access unit 944 may transport the objects to/from the task stations 906. In some embodiments, the robotic system 100 (via, e.g., the storage access system 404) can control the shelf access unit 944 to directly remove the one or more bins from the storage racks in the storage area and transport the removed bins to the picking station.

Example Operation Flow

Figure 10:
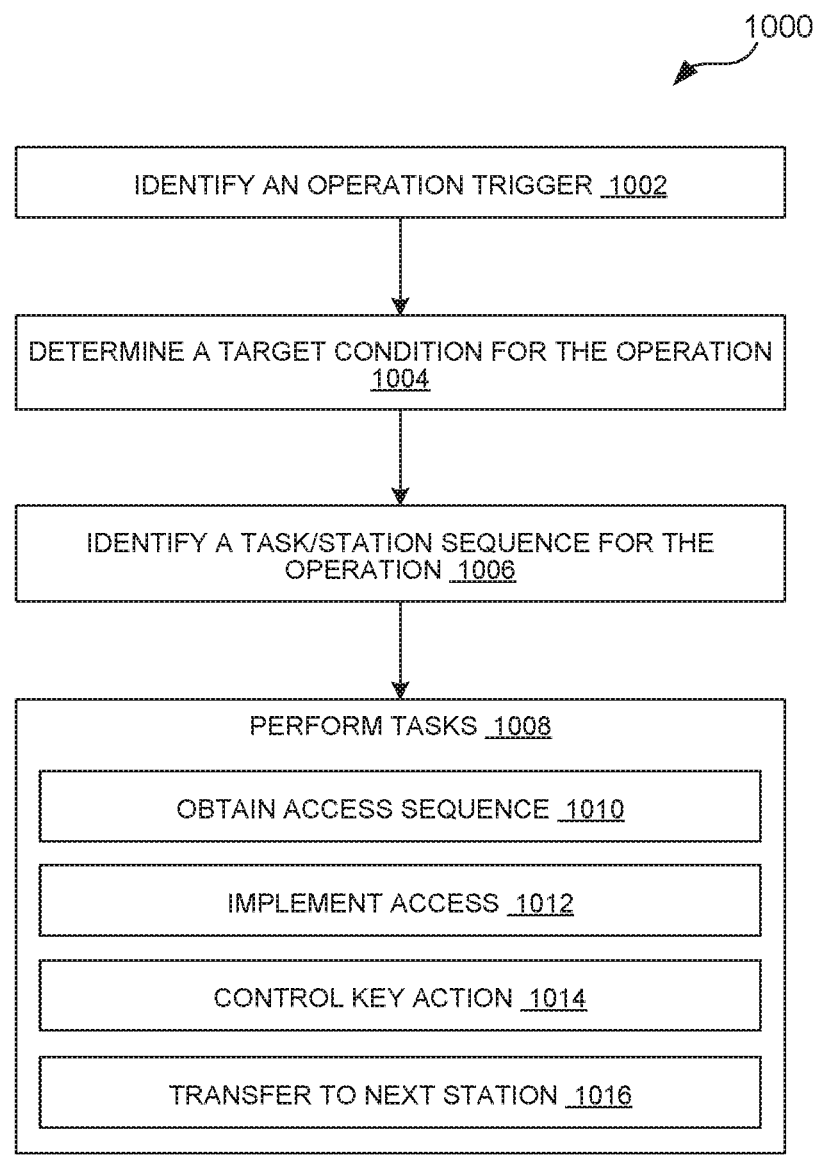
FIG. 10 is a flow diagram for a method of operating the robotic system of FIG. 1 in accordance with one or more embodiments of the present technology.

FIG. 10 is a flow diagram for a method 1000 of operating the robotic system 100 of FIG. 1 in accordance with one or more embodiments of the present technology. The method 1000 can be for performing and coordinating operations and the multiple tasks for each of the tasks. The method 1000 can be implemented based on executing the instructions stored on one or more of the storage devices 204 of FIG. 2 with one or more of the processors 202 of FIG. 2. Accordingly, the one or more processors 202 may implement operations (by, e.g., generating/sending commands, settings, and/or plans) to control one or more units (e.g., the robotic units, the sensors 216 of FIG. 2, etc.) and/or components therein.

At block 1002, the robotic system 100 can identify an operation trigger for performing an operation. In some embodiments, the management system 402 of FIG. 4 and/or the master controller 408 of FIG. 4 may identify the operation trigger based on one or more external inputs and/or operator inputs. The available operations (e.g., the receiving operation 320, the stocking operation 330, etc. illustrated in FIG. 3) may each have one or more predetermined conditions assigned as triggers. For example, an arrival of a shipping vehicle can be an operation trigger for the receiving operation 320. Object/item counts for one or more containers (e.g., pallets, bins, storage racks) falling below maintenance may trigger the stocking operation 330. Reception of an order may trigger the shipping operation 340.

At block 1004, the robotic system 100 can determine a target condition for the operation. The target condition can represent a goal or an objective associated with each operation (e.g., an end state of completing the operation). For example, the target condition for the receiving operation 320 can include groupings of incoming objects and/or storage locations for the incoming objects. The target condition for the stocking operation 330 can include updated groupings, targeted item/object counts per container, and/or updated storage locations already in storage. The target condition for the shipping operation 340 can include groupings of the ordered objects/items. The management system 402, the master controller 408, and/or the storage access system 404 of FIG. 4 can determine the target condition according to one or more predetermined rules/processes.

At block 1006, the robotic system 100 can identify a sequence of tasks and/or corresponding stations for the identified operation. For example, the management system 402 and/or the master controller 408 can identify a predetermined set/sequence of tasks associated with the triggered operation. Accordingly, the management system 402 and/or the master controller 408 can identify the robotic units, the subsystems, and/or the task stations associated with the tasks.

At block 1008, the robotic system 100 can perform the tasks according to the identified sequence. In some embodiments, the management system 402 can communicate information for triggering and performing the tasks to the master controller 408, the storage access system 404, and/or the robotic units. At each task station, the robotic system 100 can implement the corresponding task.

At block 1010, the robotic system 100 can obtain an access sequence for each task. For example, the management system 402 and/or the master controller 408 can obtain the access sequence based on computing packing simulations, tracking container placement status, coordinating incoming objects, computing rack sequences, preparing order queues, and/or identifying queue/storage information as described above.

At block 1012, the robotic system 100 can implement access of target objects/bins/racks at corresponding start locations at the corresponding task location. For example, the management system 402 and/or the master controller 408 can implement the access based on generating one or more access coordination factors (via, e.g., activating the MoveIn flag) as described above. The storage access system 404 and/or the master controller 408 can control the object transport units 305 (e.g., the AGVs 422 of FIG. 4 and/or the conveyors 424 of FIG. 4) based on the one or more access coordination factors to place the target objects/bins/racks at the start locations.

At block 1014, the robotic system 100 can control key actions of the task. For example, the master controller 408 can implement the task, such as by communicating the corresponding motion plan and/or corresponding commands/settings to the robotic unit in the task station. The master controller 408 may communicate the information to one or more units illustrated in FIG. 3, such as the devanning unit 302, the sorting unit, the object transport unit 305, the grouping unit 306, the group transport unit 307, the removing unit 308, the package opening unit 310, the rack transport unit 312, the shelving unit, the picking unit 314, and/or the packing unit 316. The robotic units can execute the motion plan or the corresponding commands/settings to perform the tasks.

At block 1016, the robotic system 100 can transfer manipulated objects/items to a subsequent task/station. For example, the management system 402 and/or the master controller 408 can implement the transfer based on generating one or more coordination factors (via, e.g., activating the MoveOut flag) as described above. The storage access system 404 and/or the master controller 408 can control the object transport units 305 (e.g., the AGVs 422 and/or the conveyors 424) based on the one or more access coordination factors to remove the target object/bins/items that was manipulated by the key action.

The robotic system 100 can repeat the above-described processes to perform subsequent task(s). The robotic system 100 can transport various objects, racks, and/or items between task stations and implement the tasks as described above to perform the triggered operations.

The robotic system 100 can coordinate a sequence of tasks for performing different operations. As described above, the robotic system 100 can coordinate various actions to sequentially perform the tasks with minimal to no operator inputs. Accordingly, the robotic system 100 can provide autonomous or near-autonomous management of operations at warehouses and/or shipping centers.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A tangible, non-transitory computer-readable medium having processor instructions stored thereon that, when executed by one or more processors, cause the one or more processors to perform a method, the method comprising:
   identifying a set of available operations including:
      (1) a receiving operation that corresponds to performing a group manipulation task adjacent to a first set of additional tasks for receiving and storing a set of incoming objects in a storage area, wherein the group manipulation task is for rearranging groupings of objects,
      (2) a stocking operation that corresponds to performing at least a racking task and the group manipulation task adjacent to each other or surrounding a package opening task, wherein the racking task is for placing objects on a storage rack or accessing and removing objects from the storage rack, wherein the stocking operation is for relocating a task target for further storage or subsequent tasks, and
      (3) a shipping operation that corresponds to performing the racking task adjacent to a second set of additional tasks for grouping task targets for outbound shipment, wherein the second set of additional tasks is different than the first set of additional tasks;
   obtaining a target condition representative of an end state of completing an operation selected from the set of available operations
   based on the target condition, identifying a sequence of tasks from the set of available operations, wherein the sequence of tasks includes a first task and a second task for performing the operation, wherein the first task or the second task includes at least one of the group manipulation task or the racking task;

obtaining an access sequence based on the first task, wherein the access sequence represents an order for placing target storage containers at a first source location of a first task station;

generating one or more access coordination factors according to the access sequence, wherein the access coordination factors are for placing the target storage containers at the first source location;

implementing the first task for accessing the task target from one of the target storage containers at the first source location and transferring the task target to a destination location at the first task station;

generating one or more transport coordination factors based on implementing the first task, wherein the transport coordination signals are for moving the task target from the destination location of the first task station to a second source location of a second task station;

implementing the second task for accessing the task target from the second source location and for manipulating the task target for completing the operation.

2. The tangible, non-transient computer-readable medium of claim 1, wherein:
the target condition representative of the receiving operation includes a storage location for a set of the incoming objects.

3. The tangible, non-transient computer-readable medium of claim 2, wherein the receiving operation includes:
a devanning task for removing the incoming objects from a carrier,
a sorting task for placing the incoming objects according to a sequence and/or at subsequent task stations,
a storage grouping task for palletizing at least a subset of the incoming objects to form the set of incoming objects, and
the group manipulation task for placing the palletized set of incoming objects at the storage location.

4. The tangible, non-transient computer-readable medium of claim 1, wherein:
the target condition corresponding to the stocking operation includes an updated location for the task target, wherein the updated location is different from an initial storage location.

5. The tangible, non-transient computer-readable medium of claim 4, wherein the stocking operation includes:
the group manipulation task for accessing the task target from the initial storage location and placing the task target at a rack feeding station, and
the racking task for placing the task target on a storage rack and for placing the storage rack that includes the task target according to the updated location.

6. The tangible, non-transient computer-readable medium of claim 4, wherein the stocking operation further comprises a package opening task for exposing items in the task target.

7. The tangible, non-transient computer-readable medium of claim 1, wherein:
the target condition corresponding to the shipping operation includes a shipping order representing a grouping of the task targets.

8. The tangible, non-transient computer-readable medium of claim 1, wherein the operation includes:
a rack picking task for accessing the task targets and transporting the task targets to a picking station, wherein accessing the task targets include removing one or more bins from one or more storage racks in or from the storage area, and
a piece picking task for transferring the task targets from the corresponding one or more bins to an outbound container.

9. The tangible, non-transient computer-readable medium of claim 8, wherein the rack picking task includes sending information to a storage access system for controlling one or more Automated Guided Vehicles (AGVs) to directly remove the one or more bins from the storage area and transport the one or more bins to a source location of the picking station.

10. The tangible, non-transient computer-readable medium of claim 8, wherein the operation includes:
the racking task for accessing the one or more storage racks from the storage area and placing the one or more storage racks at a rack picking station, and
a target transport task for transporting the one or more bins from the rack picking station to the picking station.

11. The tangible, non-transient computer-readable medium of claim 10, wherein:
the racking task for sending information to a storage access system for controlling one or more Automated Guided Vehicles (AGVs) to transport the one or more storage racks to the rack picking station,
the rack picking task includes sending commands for operating a shelving robot to remove the one or more bins from the one or more storage racks and placing the one or more bins on one end of a conveyor, and
the target transport task is for sending commands to the conveyor to transport the one or more bins from the one end of the conveyor corresponding to the rack picking station to another end of the conveyor that corresponds to the picking station.

12. The tangible, non-transient computer-readable medium of claim 8, wherein the operation includes:
a bin transport task for transporting the one or more bins from the picking station to a rack feeding station,
the racking task for placing the one or more bins on one or more storage racks and placing the one or more bins and the corresponding storage racks back in the storage area.

13. A robotic system comprising:
at least one processor; and
at least one memory device connected to the at least one processor and having stored thereon instructions executable by the processor for—
identifying a set of available operations including:
(1) a receiving operation that corresponds to performing a group manipulation task adjacent to a first set of additional tasks for receiving and storing a set of incoming objects in a storage area, wherein the group manipulation task is for rearranging groupings of objects,
(2) a stocking operation that corresponds to performing at least a racking task and the group manipulation task adjacent to each other or surrounding a package opening task, wherein the racking task is for placing objects on a storage rack or accessing and removing objects from the storage rack, wherein the stocking operations is for relocating a task target for further storage or subsequent tasks, and
(3) a shipping operation that corresponds to performing the racking task adjacent to a second set of additional tasks for grouping task targets for outbound shipment, wherein the second set of additional tasks is different than the first set of additional tasks;

obtaining a target condition representative of an end state of completing an operation selected from the set of available operations;

based on the target condition, identifying a sequence of tasks from the set of available operations, wherein the sequence of tasks includes a first task and a second task for performing the operation, wherein the first task or the second task includes at least one of the group manipulation task or the racking task;

obtaining an access sequence based on the first task, wherein the access sequence represents an order for placing target storage containers at a first source location of a first task station;

generating one or more access coordination factors according to the access sequence for coordinating a timing for operating a set of object transport robots or conveyors to transport task targets to and/or from a task station, a storage location, or a combination thereof;

deriving motion plans for operating manipulation robots to perform one or more tasks associated with the task station, the storage location, or a combination thereof; and implementing the motion plans according to a sequence for performing an operation to achieve the target condition.

14. The robotic system of claim 13, wherein the at least one processor and the at least one memory device comprises a master controller; and further comprising:
a management system operably coupled to the master controller, the management system configured to—
identify an operation trigger for initiating the operation; and
determine the target condition representative of an end state of completing the operation; and
a storage access system operably coupled to the master controller, the storage access system configured to control the set of object transport robots or conveyors according to the timing to place the one or more targets at the task stations and/or remove the one or more task targets at the task stations.

15. The robotic system of claim 13, further comprising the manipulation robots configured to perform a devanning task, a sorting task, a storage grouping task, the group manipulation task, the racking task, a package opening task, a rack picking task, a piece picking task, a target transport task, a bin transport task, or a combination thereof.

16. A method for operating a robotic system, the method comprising:
identifying a set of available operations including:
(1) a receiving operation that corresponds to performing a group manipulation task adjacent to a first set of additional tasks for receiving and storing a set of incoming objects in a storage area, wherein the group manipulation task is for rearranging groupings of objects,
(2) a stocking operation that corresponds to performing at least a racking task and the group manipulation task adjacent to each other or surrounding a package opening task, wherein the racking task is for placing objects on a storage rack or accessing and removing objects from the storage rack, wherein the stocking operation is for relocating a task target for further storage, and
(3) a shipping operation that corresponds to performing the racking task adjacent to a second set of additional tasks for grouping task targets for outbound shipment, wherein the second set of additional tasks is different than the first set of additional tasks;

obtaining a target condition representative of an end state of completing an operation selected from the set of available operations;

based on the target condition, identifying a sequence of tasks from the set of available operations, wherein the sequence of tasks includes a first task and a second task for performing the operation, wherein the first task or the second task includes at least one of the group manipulation task or the racking task;

obtaining an access sequence for a task within the sequence of tasks, wherein the access sequence represents an order for placing target storage containers at a task station;

generating the one or more access coordination factors according to the access sequence, wherein the access coordination factors are for notifying a storage access system to place one of the target storage containers at the task station;

implementing a task for transferring a task target from the one of the target storage containers to a destination location at the task station; and updating the one or more access coordination factors based on implementing the task, wherein the updated access coordination factors are for notifying the storage access system to place another one of the target storage containers at the task station.

17. The method of claim 16, further comprising:
identifying incoming objects associated with a palletizing task of a corresponding operation;
computing packing simulations for grouping the incoming objects according to one or more grouping conditions;
setting a preparation factor for notifying the storage access system to prepare the target storage containers to receive the incoming objects;
wherein:
obtaining the access sequence includes receiving container information representative of the pallets prepared by the storage access system;
generating the one or more access coordination factors includes setting a move-in factor for notifying the storage access system of a first timing to place a pallet at the destination location; and
updating the one or more access coordination factors includes setting a move-out factor for notifying the storage access system of a second timing to remove the pallet from the destination location.

18. The method of claim 16, wherein:
obtaining the access sequence includes receiving container information representative of the target storage containers prepared by the storage access system for a depalletization task of a corresponding operation, wherein the target storage containers are pallets having stored objects thereon;
generating the one or more access coordination factors includes setting a move-in factor for notifying the storage access system of a first timing to place a pallet at a source location in the task station; and updating the one or more access coordination factors includes setting a move-out factor for notifying the storage access system of a second timing to remove the pallet from the source location.

19. The method of claim 16, further comprising:

identifying incoming objects associated with a racking task of a corresponding operation, wherein the incoming objects represent depalletized objects or bins resulting from a picking task;

obtaining available rack information representative of the target storage containers identified by the storage access system as candidates for receiving the incoming objects for storage, wherein the target storage containers are storage racks configured to store the bins or the objects having items therein;

wherein:

obtaining the access sequence includes—
- computing rack sequences that each represent a sequential combination of the identified target storage containers or a subset thereof;
- identifying a selected sequence that represents one of the sequential combinations selected by the storage access system;

generating the one or more access coordination factors includes setting a move-in factor for notifying the storage access system of a first timing to place a rack at the destination location; and updating the one or more access coordination factors includes setting a move-out factor for notifying the storage access system of a second timing to remove the rack from the destination location.

20. The method of claim 16, wherein:

obtaining the access sequence includes—
- receiving rack queue information representative of a sequence of storage racks having bins thereon that include ordered items;
- receiving picking queue information representative of a sequence of the bins, wherein the rack queue information and the picking queue information represent sequences derived by the storage access system based on an order;

generating the one or more access coordination factors includes setting a move-in factor for notifying the storage access system of a first timing to place a storage rack at a source location in the task station according to the rack queue information; and updating the one or more access coordination factors includes setting a move-out factor for notifying the storage access system of a second timing to remove the storage rack from the source location;

implementing the task includes implementing a motion plan for operating a shelving unit to remove a target bin from the storage rack and place the target bin on the destination location according to the picking queue information, wherein the destination location represents a portion of a transport unit configured to transport the target bin from the task station to a subsequent station;

further comprising:

implementing a transport plan for operating the transport unit to transport the target bin from the task station to an item source location of the subsequent station; and implementing a subsequent task for picking one of the ordered items from the target bin at the item source location and placing the one of the ordered items at an item destination location.

* * * * *